United States Patent
Ko et al.

(10) Patent No.: US 12,207,215 B2
(45) Date of Patent: Jan. 21, 2025

(54) METHOD FOR MANAGING A TIME ADVANCE FOR TRANSMITTING AND RECEIVING SIGNAL IN WIRELESS COMMUNICATION SYSTEM

(71) Applicant: LG ELECTRONICS INC., Seoul (KR)

(72) Inventors: Hyunsoo Ko, Seoul (KR); Kijun Kim, Seoul (KR); Sukhyon Yoon, Seoul (KR); Hyunsu Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 390 days.

(21) Appl. No.: 17/754,228

(22) PCT Filed: Oct. 5, 2020

(86) PCT No.: PCT/KR2020/013477
§ 371 (c)(1),
(2) Date: Mar. 28, 2022

(87) PCT Pub. No.: WO2021/066607
PCT Pub. Date: Apr. 8, 2021

(65) Prior Publication Data
US 2022/0346050 A1  Oct. 27, 2022

(30) Foreign Application Priority Data
Oct. 4, 2019  (KR) .................. 10-2019-0123303

(51) Int. Cl.
*H04W 56/00* (2009.01)
*H04W 64/00* (2009.01)

(52) U.S. Cl.
CPC ... *H04W 56/0045* (2013.01); *H04W 56/0055* (2013.01); *H04W 64/006* (2013.01)

(58) Field of Classification Search
CPC .......... H04W 56/0045; H04W 56/0055; H04W 64/006; H04W 56/00; G01S 5/02; H04L 5/00
See application file for complete search history.

(56) References Cited

U.S. PATENT DOCUMENTS

2011/0171949 A1* 7/2011 Liao .................. H04W 56/0045
455/422.1
2013/0336307 A1* 12/2013 Park ...................... H04W 56/00
370/350

(Continued)

FOREIGN PATENT DOCUMENTS

KR    10-2011-0085889    7/2011

OTHER PUBLICATIONS

PCT International Application No. PCT/KR2020/013477, International Search Report dated Jan. 22, 2021, 4 pages.

(Continued)

*Primary Examiner* — Ian N Moore
*Assistant Examiner* — Latresa A McCallum
(74) *Attorney, Agent, or Firm* — LEE, HONG, DEGERMAN, KANG & WAIMEY

(57) ABSTRACT

The present invention relates to a method carried out by a user equipment in a wireless communication system and a device supporting same and, more particularly, to a method and a device supporting same, the method comprising the steps of: obtaining a first reference time related to the transmission of a first reference signal (RS) for positioning; determining a compensation value on the basis of the difference between the first reference time and an uplink transmission timing which is obtained from a timing advance (TA) and a downlink reception timing; and transmitting the first RS on the basis of the compensation value.

12 Claims, 27 Drawing Sheets

(56) References Cited

U.S. PATENT DOCUMENTS

| | | | |
|---|---|---|---|
| 2014/0094188 A1* | 4/2014 | Kazmi | H04W 4/023 455/456.1 |
| 2016/0284186 A1* | 9/2016 | Pavlich | H04W 4/023 |
| 2016/0295366 A1* | 10/2016 | Priyanto | G01S 1/10 |
| 2018/0206262 A1* | 7/2018 | Cao | H04W 72/1268 |
| 2020/0245372 A1* | 7/2020 | Lei | H04W 72/23 |

OTHER PUBLICATIONS

Samsung, "Discussion on necessity and details for physical-layer procedures to support UE/gNB measurements," R1-1908512, 3GPP TSG RAN WG1 #98, Aug. 2019, 8 pages.
LG Electronics, "Discussions on DL and UL Reference Signals for NR Positioning," R1-1904200, 3GPP TSG RAN WG1 #96bis, Apr. 2019, 11 pages.
Catt, "UE and gNB measurements for NR Positioning," R1-1906307, 3GPP TSG RAN WG1 #97, May 2019, 13 pages.
Nokia et al., "Views on UL reference signals for NR Positioning," R1-1908347, 3GPP TSG RAN WG1 #98, Aug. 2019, 9 pages.

* cited by examiner

FIG. 7
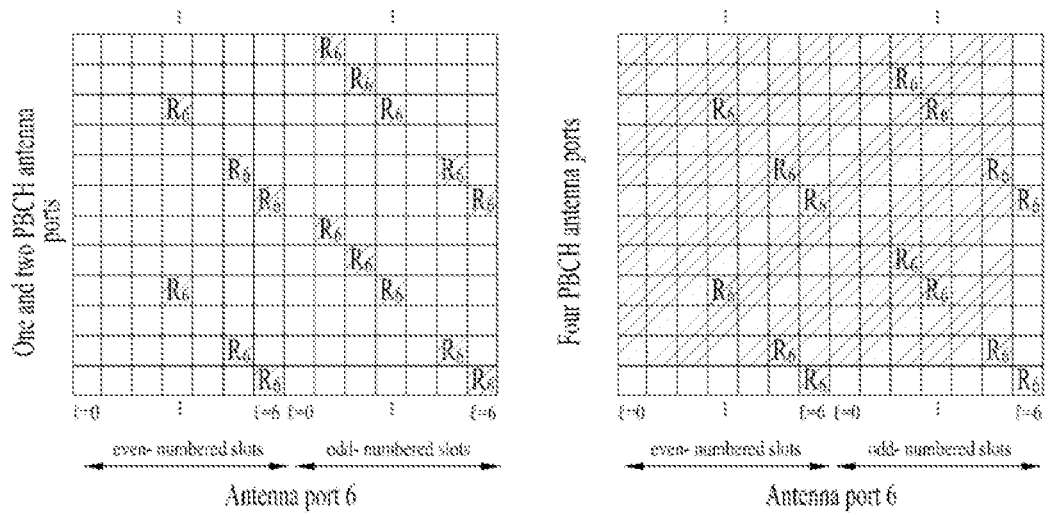
(a)
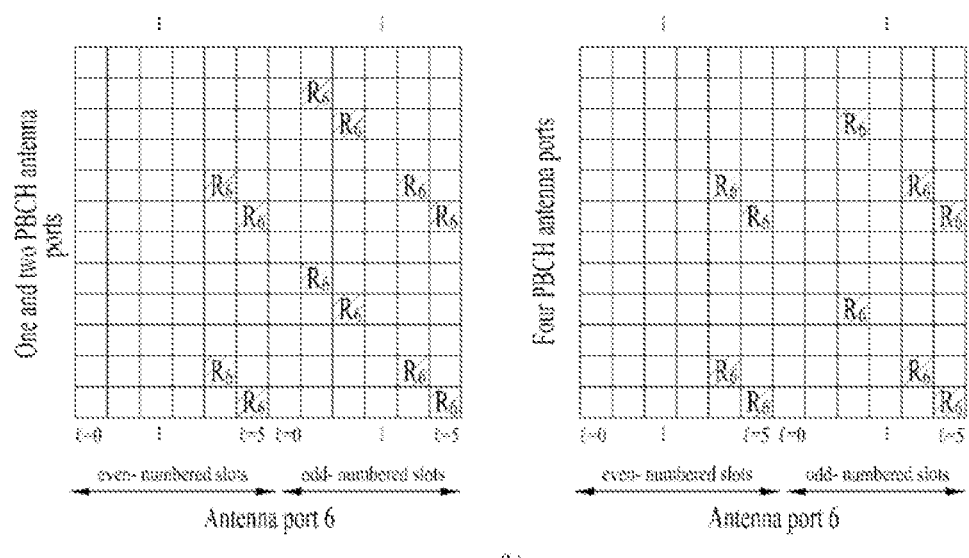
(b)

FIG. 13
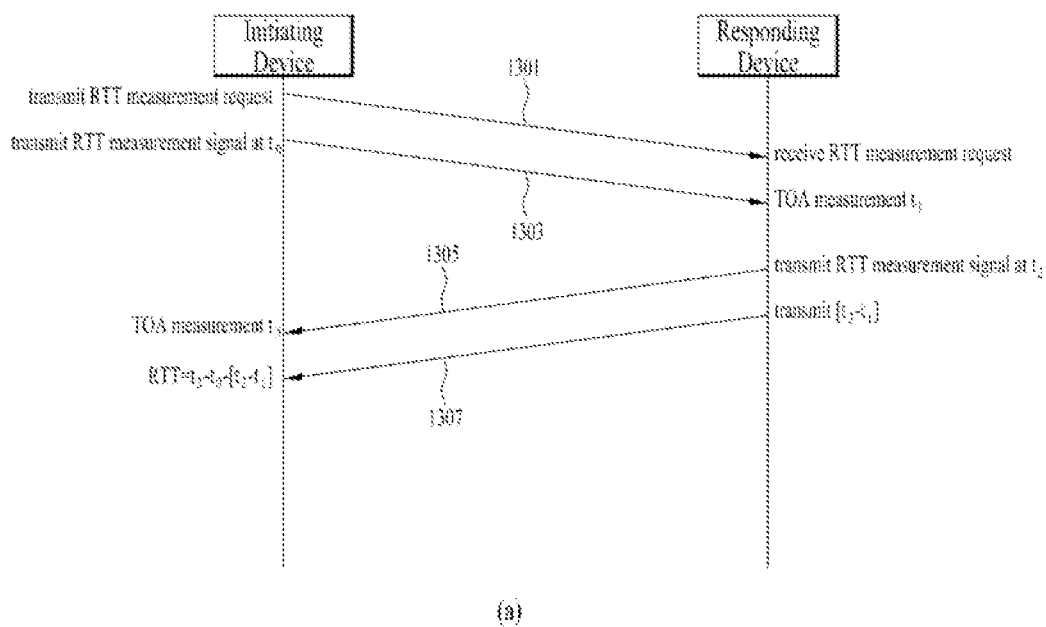
(a)
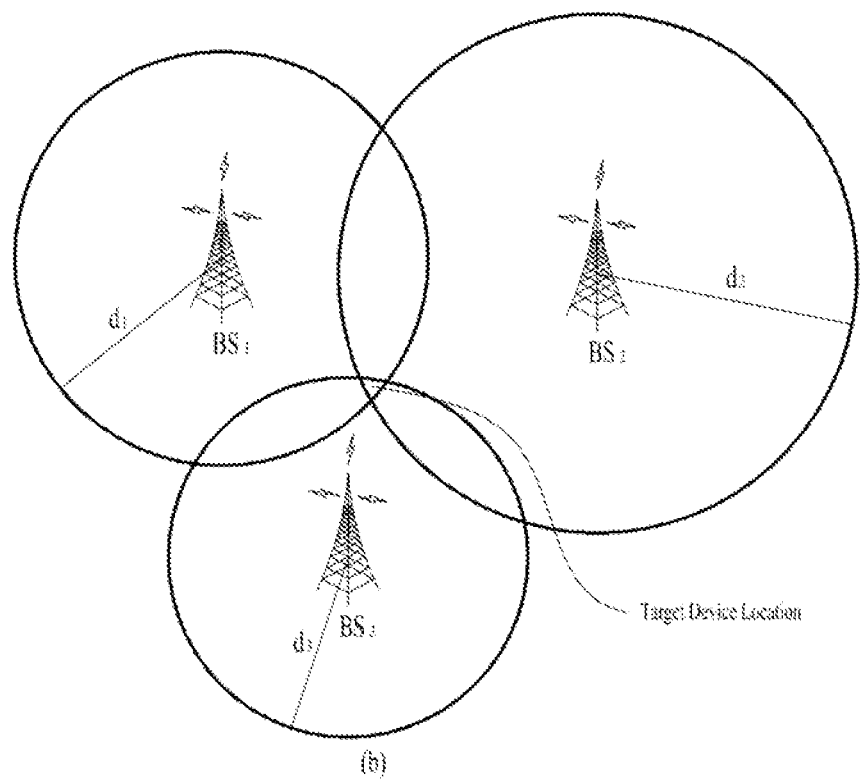
(b)

METHOD FOR MANAGING A TIME ADVANCE FOR TRANSMITTING AND RECEIVING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/013477, filed on Oct. 5, 2020, which claims the benefit of earlier filing date and right of priority to Korean Application No. 10-2019-0123303 filed on Oct. 4, 2019, the contents of which are all hereby incorporated by reference herein in their entireties.

TECHNICAL FIELD

Various embodiments relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method of transmitting and receiving a signal in a wireless communication system, and an apparatus supporting the same.

According to various embodiments, a method performed by a user equipment (UE) in a wireless communication system may be provided.

According to various embodiments, the method may include obtaining a first reference time related to transmission of a first reference signal (RS) for positioning; determining a compensation value based on a difference between an uplink transmission timing, obtained from a timing advance (TA) and a downlink reception timing, and the first reference time; and transmitting the first RS based on the compensation value.

According to various embodiments, the first RS may be transmitted from (i) the reference time based on application of the compensation value to the uplink transmission timing, or (ii) the uplink transmission timing based on application of a cyclic shift value related to the compensation value to each resource element (RE) to which the first RS is mapped.

According to various embodiments, the first reference time may be maintained during a preset time duration, and the reference time may be updated to a second reference time after the preset time duration.

According to various embodiments, the method may further include transmitting information related to the second reference time.

According to various embodiments, the method may further include receiving information related to configuration of the preset time duration.

According to various embodiments, the first reference time may be updated to a third reference time based on the difference between the uplink transmission timing and the first reference time being equal to or greater than a preset value.

According to various embodiments, the compensation value may be determined based on the third reference time According to various embodiments, a difference between the uplink transmission timing and the third reference time may be less than the preset value.

According to various embodiments, the method may further include transmitting information related to the difference between the uplink transmission timing and the first reference time being equal to or greater than the preset value According to various embodiments, the method may further include transmitting information related to the third reference time.

According to various embodiments, the first reference time may be obtained from a transmission timing of a second RS for positioning, transmitted before the first RS is transmitted.

According to various embodiments, an apparatus for operating in a wireless communication system may be provided.

According to various embodiments, the apparatus may include a memory; and one or more processors connected to the memory.

According to various embodiments, the one or more processors may obtain a first reference time related to transmission of a first reference signal (RS) for positioning, determine a compensation value based on a difference between an uplink transmission timing, obtained from a timing advance (TA) and a downlink reception timing, and the first reference time, and transmit the first RS based on the compensation value.

According to various embodiments, the first RS may be transmitted from (i) the reference time based on application of the compensation value to the uplink transmission timing, or (ii) the uplink transmission timing based on application of a cyclic shift value related to the compensation value to each resource element (RE) to which the first RS is mapped.

According to various embodiments, the first reference time may be maintained during a preset time duration, and the reference time may be updated to a second reference time after the preset time duration.

According to various embodiments, one or more processors may transmit information related to the second reference time According to various embodiments, the apparatus may communicate with one or more of a mobile terminal, a network, and an autonomous driving vehicle other than a vehicle in which the apparatus is included.

According to various embodiments, a method performed by an apparatus in a wireless communication system may be provided.

According to various embodiments, the method may include receiving a first reference signal (RS) for positioning based on a compensation value; and decoding the first RS.

According to various embodiments, the compensation value may be determined based on a difference between an uplink transmission timing, obtained from a timing advance (TA) and a downlink reception timing, and a first reference time related to transmission of the first RS.

According to various embodiments, an apparatus for operating in a wireless communication system may be provided.

According to various embodiments, the apparatus may include a memory; and one or more processors connected to the memory.

According to various embodiments, the one or more processors may receive a first reference signal (RS) for positioning based on a compensation value. And decode the first RS According to various embodiments, the compensation value may be determined based on a difference between an uplink transmission timing, obtained from a timing advance (TA) and a downlink reception timing, and a first reference time related to transmission of the first RS.

According to various embodiments, an apparatus for operating in a wireless communication system may be provided.

According to various embodiments, the apparatus may include one or more processors; and one or more memories configured to store one or more instructions causing the one or more processors to perform a method.

According to various embodiments, the method may include obtaining a first reference time related to transmission of a first reference signal (RS) for positioning; determining a compensation value based on a difference between an uplink transmission timing, obtained from a timing advance (TA) and a downlink reception timing, and the first reference time; and transmitting the first RS based on the compensation value.

According to various embodiments, a processor-readable medium for storing one or more instructions causing one or more processors to perform a method may be provided.

According to various embodiments, the method may include obtaining a first reference time related to transmission of a first reference signal (RS) for positioning; determining a compensation value based on a difference between an uplink transmission timing, obtained from a timing advance (TA) and a downlink reception timing, and the first reference time; and transmitting the first RS based on the compensation value.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments, signals may be effectively transmitted and received in a wireless communication system.

According to various embodiments, positioning may be effectively performed in a wireless communication system.

According to various embodiments, accuracy of positioning may be improved by preventing the case in which a transmission and/or reception time of a UL RS received from a UE is changed although the UE does not move from occurring.

According to various embodiments, accuracy of positioning may be improved by preventing the case in which a transmission and/or reception time of a DL RS received by a UE is changed although the UE does not move from occurring.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

BRIEF DESCRIPTION OF THE DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 7 illustrates exemplary mapping of a positioning reference signal (PRS) in a long term evolution (LTE) system to which various embodiments are applicable.

FIG. 13 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
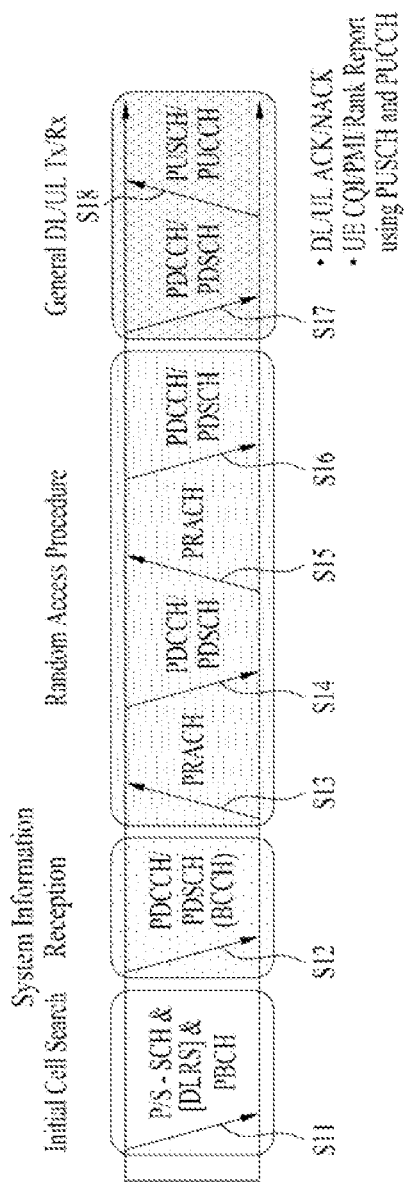
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When a UE is powered on or enters a new cell, the UE performs initial cell search (S11). The initial cell search involves acquisition of synchronization to a BS. Specifically, the UE synchronizes its timing to the base station and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the base station.

During the initial cell search, the UE may monitor a DL channel state by receiving a Downlink Reference Signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be combined into one operation for a UE transmission, and steps S14 and S16 may be combined into one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
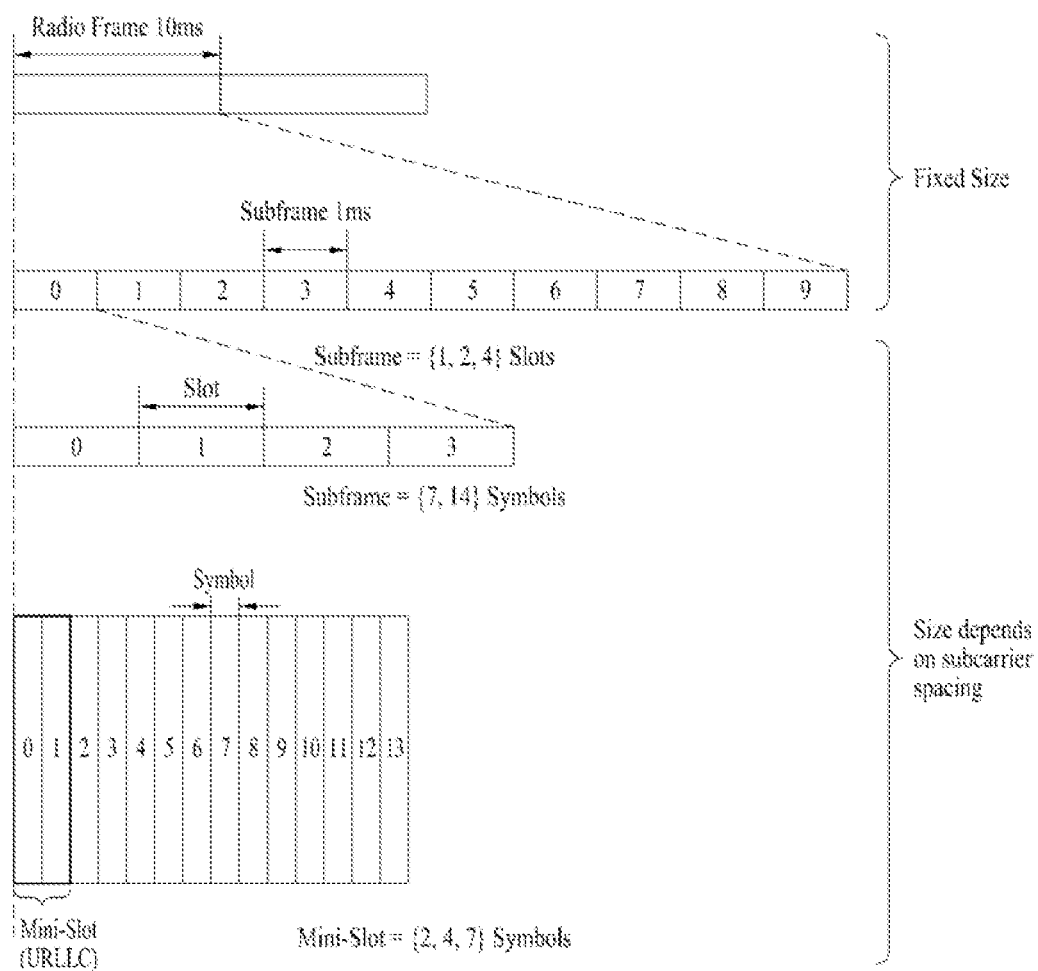
FIG. 2 is a diagram illustrating a resource grid in a new radio (NR) system to which various embodiments are applicable.

FIG. 2 is a diagram illustrating a radio frame structure in an NR system to which various embodiments are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, μ and a CP are obtained from RRC parameters provided by the BS.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 20, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15\ kHz)*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology u, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot n s in a subframe is aligned in time with the start of an OFDM symbol $n^\mu_s * N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{frame,\mu}_{slot}$ represents the number of slots in a subframe.

In the NR system to which various embodiments are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
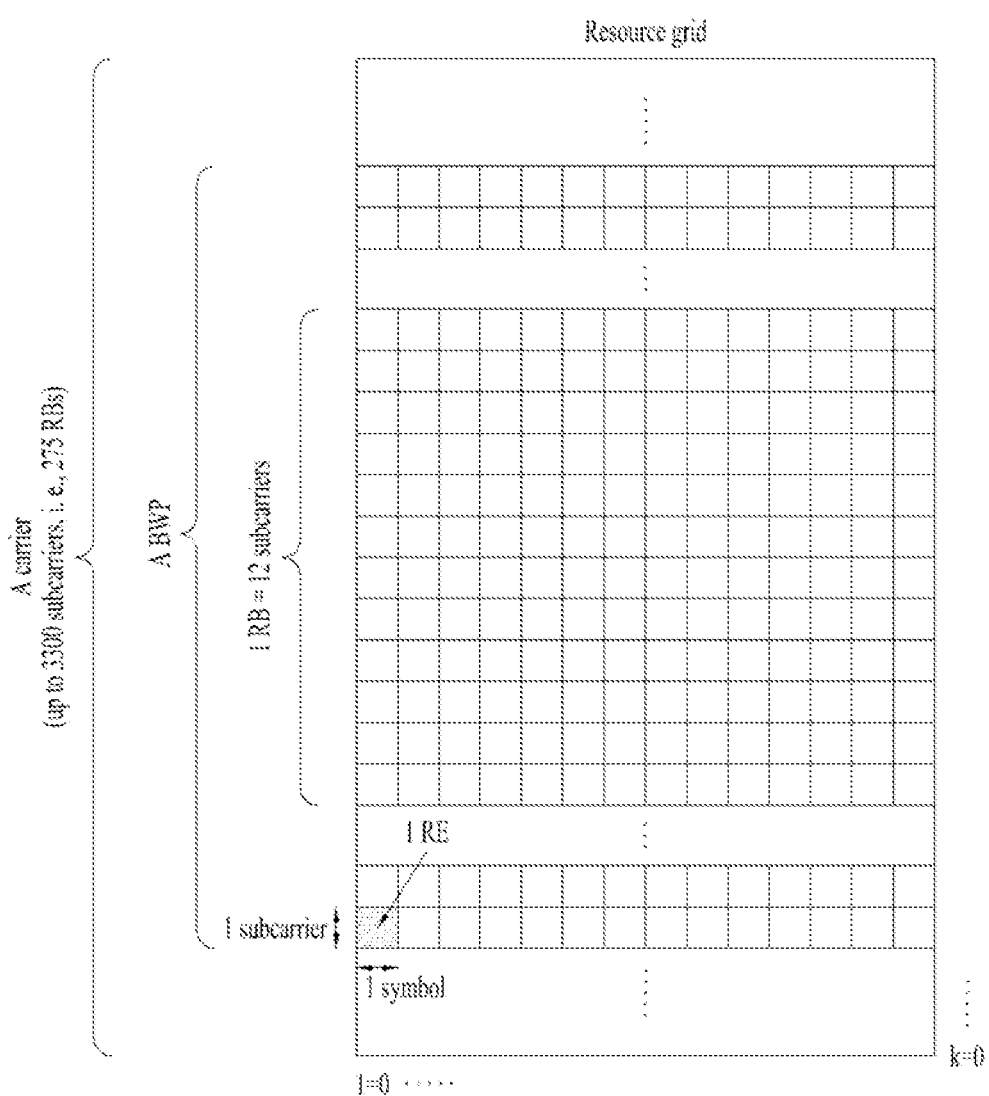
FIG. 3 is a diagram illustrating a slot structure in an NR system to which various embodiments are applicable.

FIG. 3 is a diagram illustrating a slot structure in an NR system to which various embodiments are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
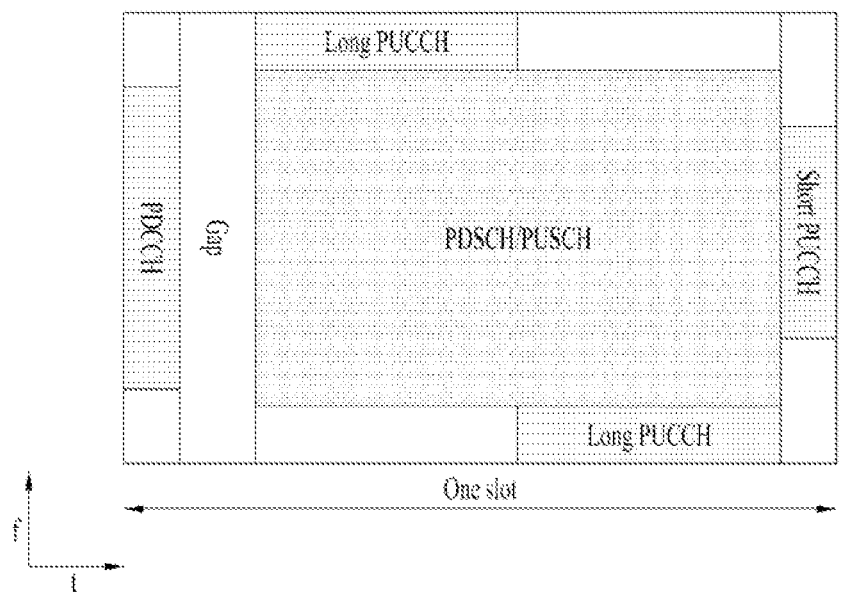
FIG. 4 is a diagram illustrating mapping of physical channels in a slot, to which various embodiments are applicable.

FIG. 4 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

1.3. Channel Structures

1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. QCL (Quasi Co-Located or Quasi Co-Location)

The UE may receive a list of up to M TCI-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific NZP CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

1.5. UL-DL Timing Relationship

Timing advance maintenance on UL will now be described.

In a system based on OFDM technology, a time required for a signal transmitted by a UE to reach a BS may vary depending on the radius of a cell, the location of the UE within the cell, and/or the moving speed of the UE. That is, if the BS does not separately manage transmission signal timings of respective UEs, there is a possibility that a transmission signal of a UE may interfere with signals transmitted by other UEs, and thus an error rate of signals received by the BS increases.

More specifically, a time consumed for a signal transmitted by a UE attempting to perform transmission at a cell edge to arrive at the BS will be longer than a time required for a signal transmitted by a UE at the center of the cell to arrive at the BS. Conversely, a time required for a signal transmitted by the UE located at the center of the cell to arrive at the BS will be relatively shorter than that of the UE located at the edge of the cell.

Since data or signals that all UEs in the cell transmit should be received within every valid time boundary in order to prevent interference in terms of the BS, the BS needs to appropriately adjust transmission timings of the signals transmitted by the UEs according to situations of the UEs and this adjustment is referred to as timing advance management.

One method of managing a timing advance may be a random access operation. That is, the random access operation causes the BS to receive a random access preamble transmitted by the UE. The BS calculates a timing advance value to make a transmission timing of the UE faster or slower using information about the received random access preamble. Then, the BS informs the UE of the calculated timing advance value through a random access response. The UE updates a UL transmission timing using the timing advance value.

As another method, the BS receives a sounding reference signal (SRS) periodically or randomly transmitted by the UE and calculates the timing advance value for the UE through the received signal. The BS informs the UE of the timing advance value and then the UE updates a transmission timing thereof.

As described above, the BS measures the transmission timing of the UE through the random access preamble or the SRS, calculates a timing value to be corrected, and informs the UE of the timing value to be corrected. The timing advance value (i.e., timing value to be corrected) transmitted by the BS to the UE is referred to as a timing advance command (TAC). The TAC is processed in a MAC layer. Since the UE is not always located at a fixed position, the transmission timing of the UE is changed at every time according to the moving speed of the UE and the location of the UE.

In this regard, upon receiving the TAC once from the BS, the UE needs to assume that the TAC is not always valid for an infinite time but the TAC is valid only for a specific time. A timing advance timer (TAT) is used for this purpose. That is, upon receiving the TAC from the BS, the UE starts the TAT. The UE assumes that a UL timing thereof is synchronized with the BS when the TAT is in operation. The value of the TAT may be transmitted through an RRC signal such as system information or radio bearer reconfiguration. Upon receiving a new TAC from the BS while the TAT is in operation, the UE restarts the TAT. When the TAT expires or the TAT does not operate, the UE does not transmit any UL signals, such as PUSCH and PUCCH signals, except for the random access preamble, under the assumption that the UL timing of the UE is not synchronized with the BS.

Figure 5:
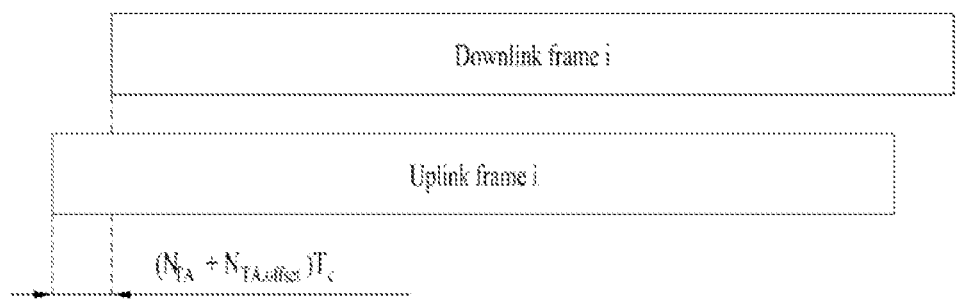
FIG. 5 is a diagram illustrating an exemplary UL-DL timing relationship, which is applicable to various embodiments.

FIG. 5 is a diagram illustrating an exemplary UL-DL timing relationship applicable to various embodiments.

Referring to FIG. 5, the UE starts to perform transmission from $T_{TA}=(N_{TA}+N_{TA,offset})T_c$ seconds before transmitting a DL frame corresponding to a UL frame i. As an exceptional case, $T_{TA}=0$ may be used to transmit message A (msgA) on a PUSCH. Here, $T_c=0.509$ ns.

The UE may be provided with the value of $N_{TA,offset}$ of a timing advance offset for a serving cell by n-TimingAdvanceOffset for the serving cell. If no n-TimingAdvanceOffset is provided to the UE, the UE may determine a default value of $N_{TA,offset}$ of the timing advance offset for the serving cell.

In the case of the random access response, a TAC $T_A$ for a timing advance group (TAG) indicates the value of $N_{TA}$ through an index value of $T_A=0, 1, 2, \ldots, 3846$. Here, the amount of a timing advance for the TAG having an SCS of $2^\mu*15$ kHz is $N_{TA}=T_A*16*64/2^\mu$. $N_{TA}$ is related to an SCS of the first UL transmission by the UE after the UE receives the random access response.

In another case, the TAC $T_A$ for the TAG commands that a current $N_{TA}$ value $N_{TA\_old}$ be adjusted to a new $N_{TA}$ value $N_{TA\_new}$ through the index value of $T_A=0, 1, 2, \ldots, 3846$. Here, for an SCS of 29*15 kHz, $N_{TA\_new}=N_{TA\_old}+(T_A-31)*16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
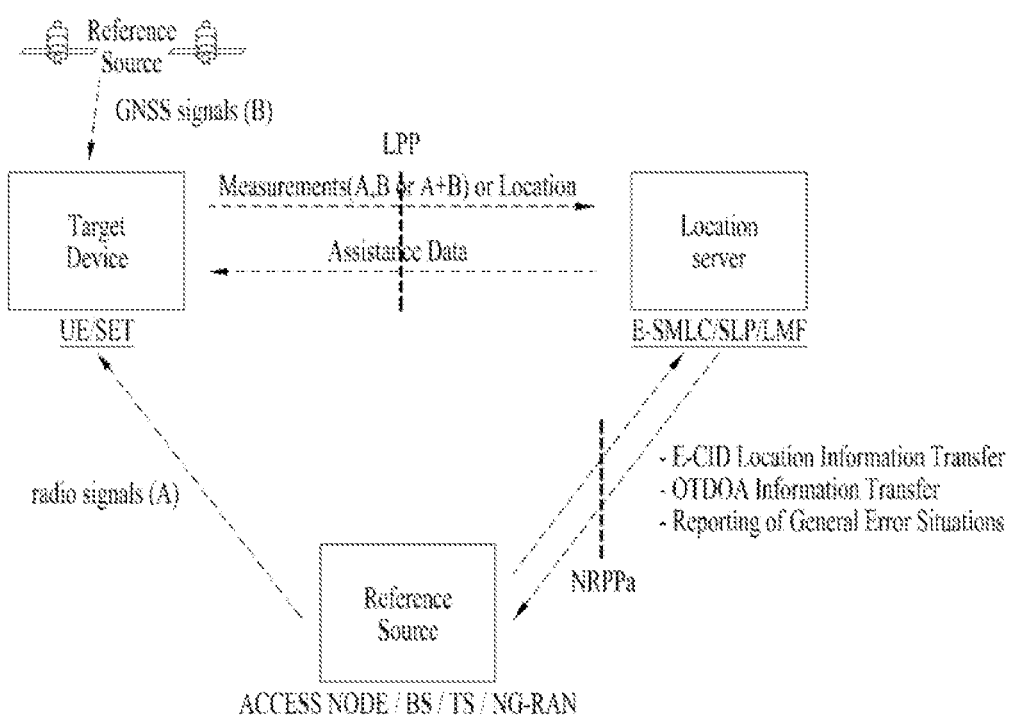
FIG. 6 is a diagram illustrating an exemplary positioning protocol configuration for UE positioning, which is applicable to various embodiments.

FIG. 6 is a diagram illustrating an exemplary positioning protocol configuration for UE positioning, to which various embodiments are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:

E-CID Location Information Transfer. This function allows exchange of location information between a reference source and an LMF, for the purpose of E-CID positioning.

OTDOA Information Transfer. This function allows exchange of information between the reference source and the LMF for the purpose of OTDOA positioning.

Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

In Equation 1, $n_s$ denotes a slot number in a radio frame and l denotes an OFDM symbol number in a slot. $N_{RB}^{max,DL}$ is the largest of DL bandwidth configurations, expressed as $N_{sc}^{RB}$. $N_{sc}^{RB}$ denotes the size of an RB in the frequency domain, for example, 12 subcarriers.

c(i) denotes a pseudo-random sequence and may be initialized by Equation 2 below.

$$c_{init}=2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP} \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

Figure 11:
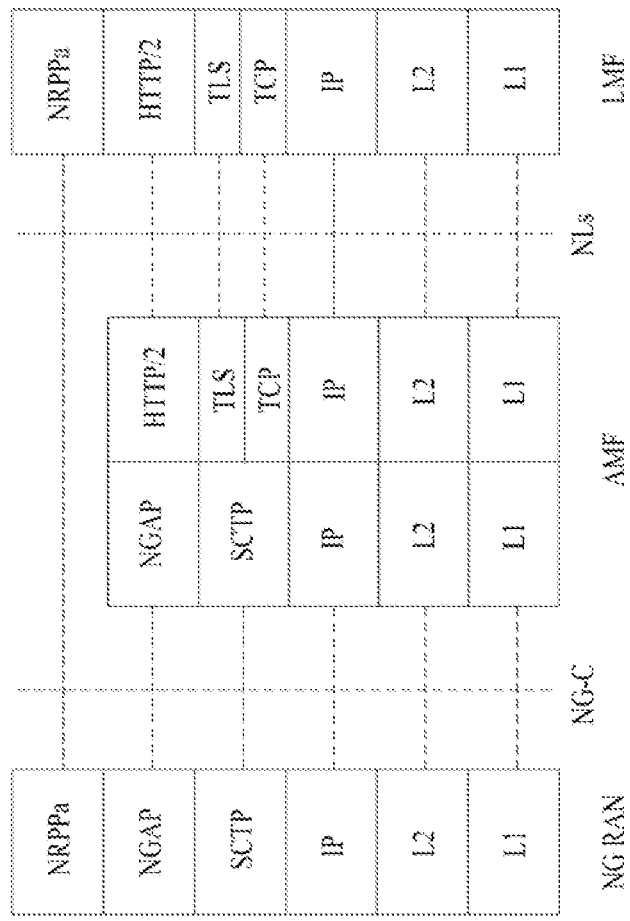
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
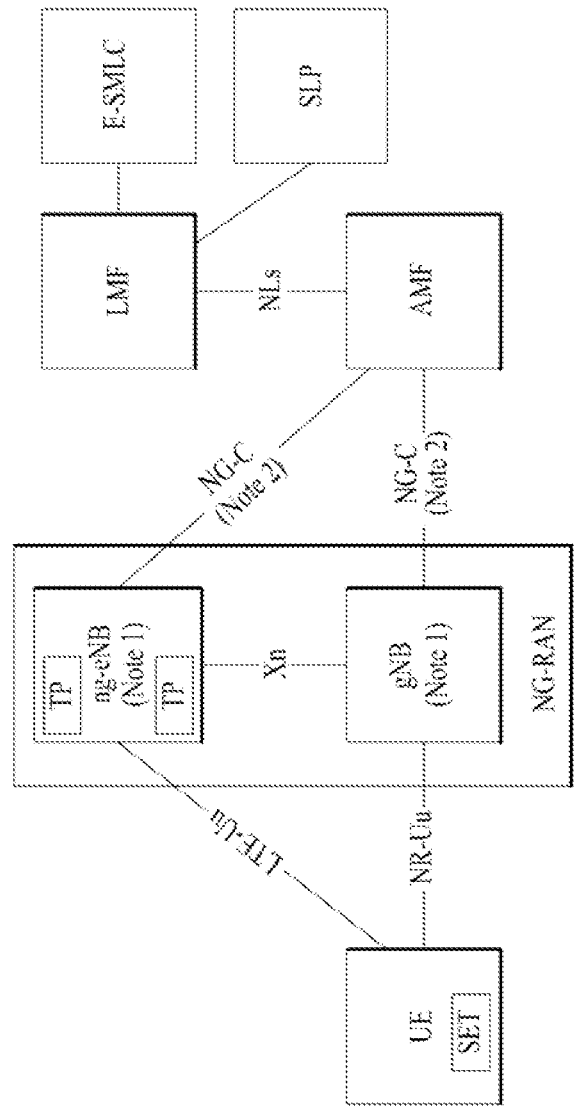
FIG. 8 is a diagram illustrating an example of an architecture of a system for positioning a UE, to which various embodiments are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
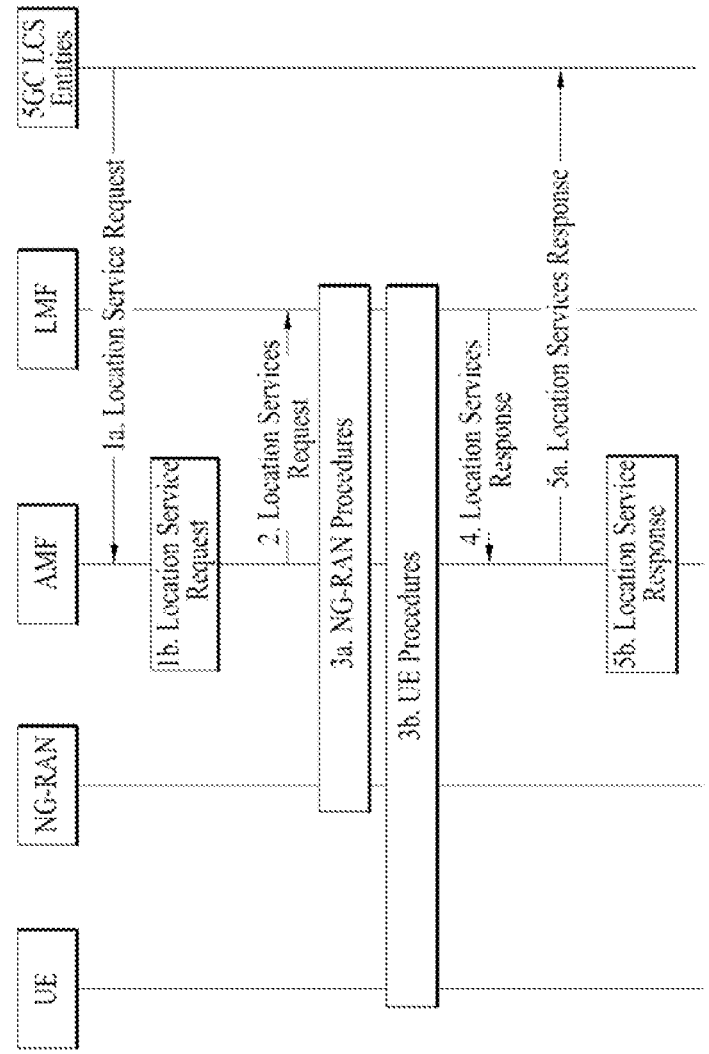
FIG. 9 is a diagram illustrating an example of a procedure of positioning a UE, to which various embodiments are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 9 has been initiated by step 1*a*, the AMF may transfer the location service response to a 5GC entity such as a GMLC. If the procedure of FIG. 9 has been initiated by step 1*b*, the AMF may use the location service response in order to provide a location service related to an emergency call.

2.5. Positioning Protocol 2.5.1. LTE Positioning Protocol (LPP)

Figure 10:
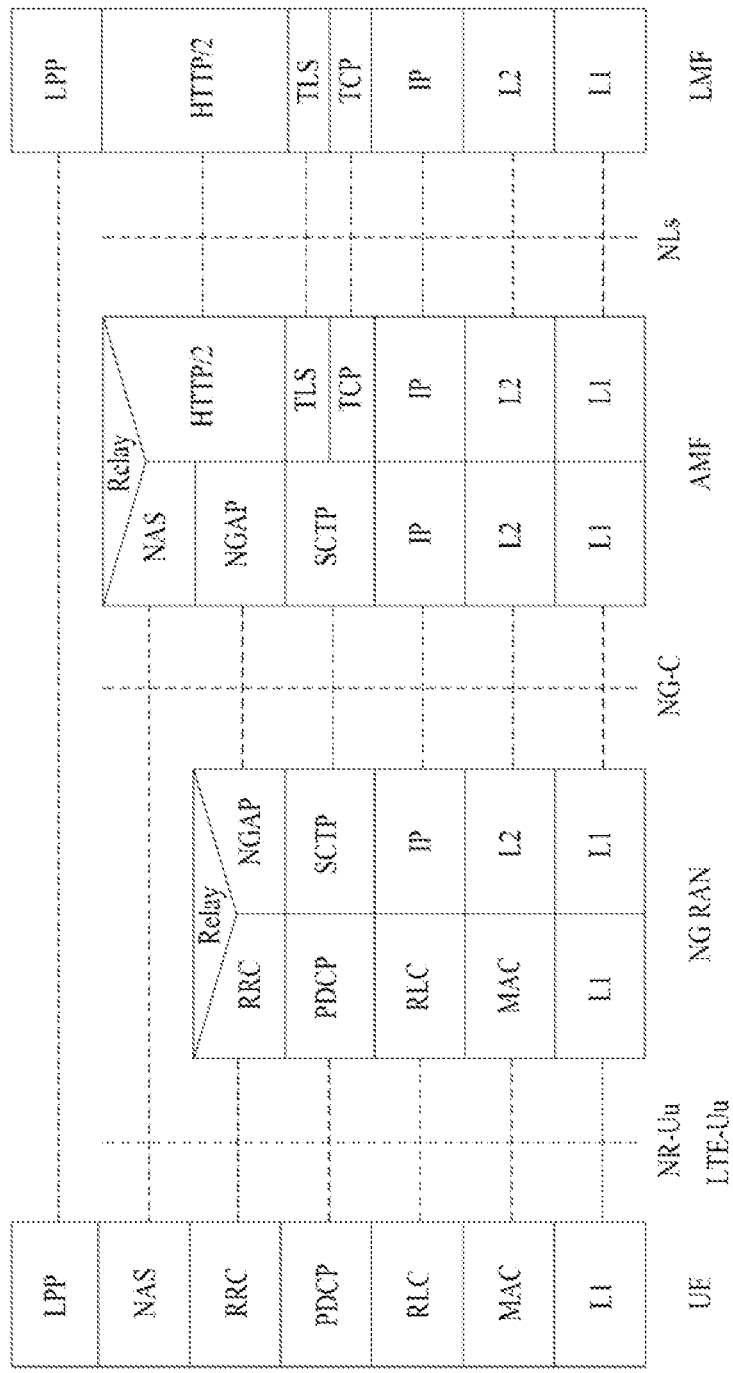
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol a (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
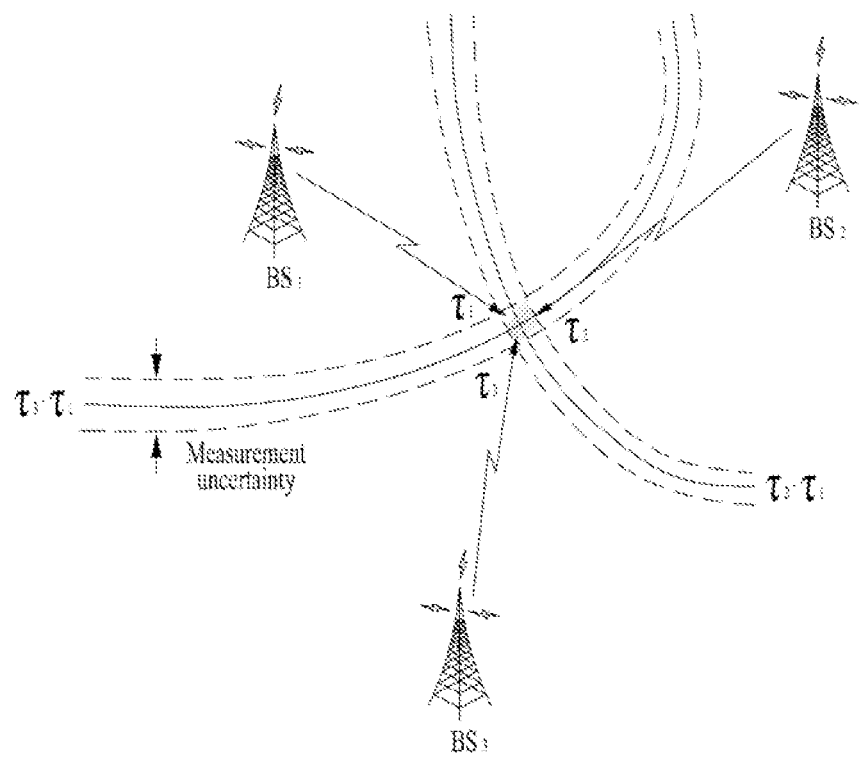
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i-T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{ADV}$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

FIG. 13 is a diagram illustrating an exemplary multi-RTT positioning method to which various embodiments are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time $t_0$, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \quad \text{[Equation 4]}$$

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered respectively.

3. Various Embodiments

Various embodiments will be described below in detail based on the above-described technical idea. Clause 1 and clause 2 may be applied to the various embodiments. For example, operations, functions, and terms which are not defined in the various embodiments may be performed and described based on clause 1 and clause 2.

Symbol/abbreviations/terms used in the following description of various embodiments are described below.

A/B/C: A and/or B and/or C
CSI-RS: channel state information reference signal
Comb: mapping a signal at predetermined intervals in the frequency domain. For example, comb 2 (comb-2 or 2-comb) may represent mapping of a specific equal RS to every RE separated at an interval of two subcarriers. For example, comb 4 (comb-4 or 4-comb) may represent mapping of a specific equal RS to every RE separated at an interval of four subcarriers
GPS: global positioning system
LMF: location management function
MAC: medium access control
PRS: positioning reference signal
RB: resource block
RE: resource element
RS: reference signal
SRS: sounding reference signal,
SS: synchronization signal
SSB: synchronization signal block
SS/PBCH: synchronization signal/physical broadcast channel
TA: timing advance/time advance
TOA (ToA): time of arrival
TRP: transmission reception point (TP: transmission point)
UL PRS: uplink positioning reference signal. The UL PRS may represent a UL reference signal (RS) used for positioning. For example, the UL PRS may be an SRS for positioning but is not limited thereto.

In a description of various embodiments, a BS may be understood as a generic term including a remote radio head (RRH), an eNB, a gNB, a TP, a reception point (RP), and a relay.

In a description of various embodiments, "exceeding A" may be replaced with "A or over", and "A or over" may be replaced with "exceeding A".

In a description of various embodiments, "less than B" may be replaced with "B or below", and "B or below" may be replaced with "less than B".

Problems to be solved in various embodiments will now be described. This is purely exemplary and the problems to be solved in various embodiments are not limited to Problems A and Problems B to be described below.

Problem A-UL

For example, in a UL positioning scheme in which the location of the UE is estimated based on signals of a plurality of reception stations (and/or BSs/TRPs/LMFs) that receive UL signals (e.g., an SRS, a UL PRS, etc.) transmitted by the UE may transmit the UL signals at multiple timings and a plurality of BSs may receive the signals of the UE at respective timings.

For example, upon estimating the location of the UE using signals received by the plural BSs, the BSs may estimate the location of the UE using characteristics in which timings at which the BS receive the signals from the UE differ due to signal transmission delay generated according to a starting timing and a distance at which the UE transmits a signal.

For example, for some reasons, if the UE changes a starting time (reference time) at which the UE transmits a signal to a time different from a time at which the UE previously transmitted a UL signal (e.g., when a DL reception time becomes different or a UL TA is applied), a certain BS may receive a UL signal at a time different from a time at which the BS previously received a UL signal. In this case, when the BS estimates the location of the UE using the corresponding UL signals, 1) time delay occurs according to the location of the UE and 2) time information caused by other factors is included, so that it may be difficult to accurately estimate the location of the UE. Therefore, there is a need to solve this problem so that the location of the UE may be accurately estimated.

Problem B-DL

For example, in a DL positioning scheme in which the UE receives DL signals (e.g., synchronization signal blocks (SSBs), DL PRSs, and/or channel state information reference signals CSI-RSs) transmitted by a plurality of BSs and the location of the UE is estimated based on a difference in a reception time between the signals received from the BSs, related information is reported to the location server/LMF etc., and the location server/LMF, etc. may estimate the location of the UE and/or the UE may directly estimate the location thereof. For example, DL signal transmission delay generated due to a difference in a distance between each BS and the UE is measured. Then, the UE may estimate a difference of a relative distance from the BS and/or a difference of a relative distance between the UE and the BS.

For example, when there is a difference in a transmission timing between DL signals transmitted by respective BSs (due to a timing error, etc.), a factor generating signal delay includes a distance between the BS and the UE and additionally includes other factors. An error may be generated in a relative distance that the UE estimates from this signal delay (and/or in a relative distance between the UE and the BS, estimated based on the signal delay). Accordingly, for precise location estimation, an error problem of a transmission timing needs to be solved.

Various embodiments may be related to a method of accurately measuring the location of the UE although the UE changes a UL transmission timing when UL based positioning is performed in a system supporting NR.

For example, the case in which the UL transmission timing is changed may be the case in which the UL transmission timing is changed according to change of a DL reception timing or the case in which the UL transmission timing is changed by indication of a TA value.

For example, Problem A and Problem B described above may be solved by various embodiments.

Figure 14:
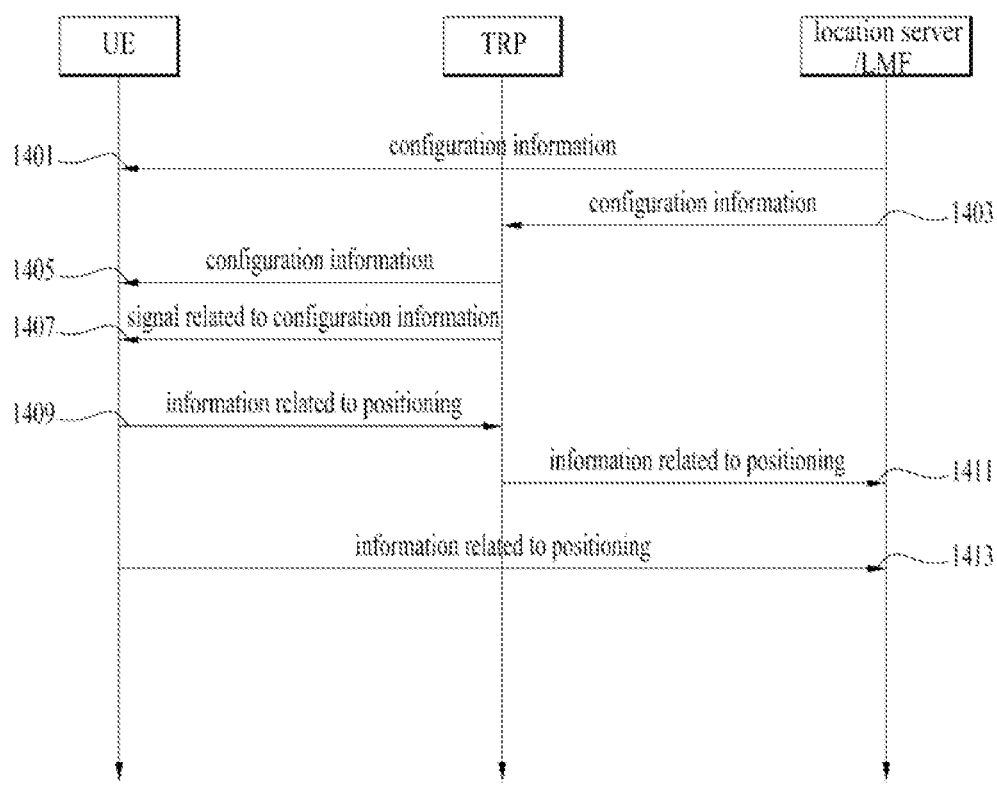
FIG. 14 is a simplified diagram illustrating a method of operating a UE, a transmission and reception point (TRP), a location server, and/or a location management function (LMF) according to various embodiments.

FIG. 14 is a simplified diagram illustrating an operating method of a UE, a TRP, a location server, and/or an LMF according to various embodiments.

Referring to FIG. 14, in operation 1401 according to various embodiments, the location server and/or the LMF may transmit configuration information to the UE and the UE may receive the configuration information.

In operation 1403 according to various embodiments, the location server and/or the LMF may transmit reference configuration information to the TRP and the TRP may receive the reference configuration information. In operation 1405 according to various embodiments, the TRP may transmit the reference configuration information to the UE and the UE may receive the reference configuration information. In this case, operation 1401 according to various embodiments may be omitted.

In contrast, operations 1403 and 1405 according to various embodiments may be omitted. In this case, operation 1401 according to various embodiments may be performed.

That is, operation 1401 according to various embodiments, and operations 1403 and 1405 according to various embodiments may be selectively performed.

In operation 1407 according to various embodiments, the TRP may transmit a signal related to the configuration information and the UE may receive the signal related to the configuration information. For example, the signal related to the configuration information may be a signal for positioning of the UE.

In operation 1409 according to various embodiments, the UE may transmit a signal related to positioning to the TRP and the TRP may receive the signal related to positioning. In operation 1411 according to various embodiments, the TRP may transmit the signal related to positioning to the location server and/or the LMF and the location server and/or the LMF may receive the signal related to positioning.

In operation 1413 according to various embodiments, the UE may transmit the signal related to positioning to the location server and/or the LMF and the location server and/or the LMF may receive the signal related to positioning. In this case, operations 1409 and 1411 according to various embodiments may be omitted.

In contrast, operation 1413 according to various embodiments may be omitted. In this case, operations 1409 and 1411 according to various embodiments may be performed.

That is, operations 1409 and 1411 according to various embodiments, and operation 1413 according to various embodiments may be selectively performed.

According to various embodiments, the signal related to positioning may be obtained based on the configuration information and/or the signal related to the configuration information.

Figure 15:
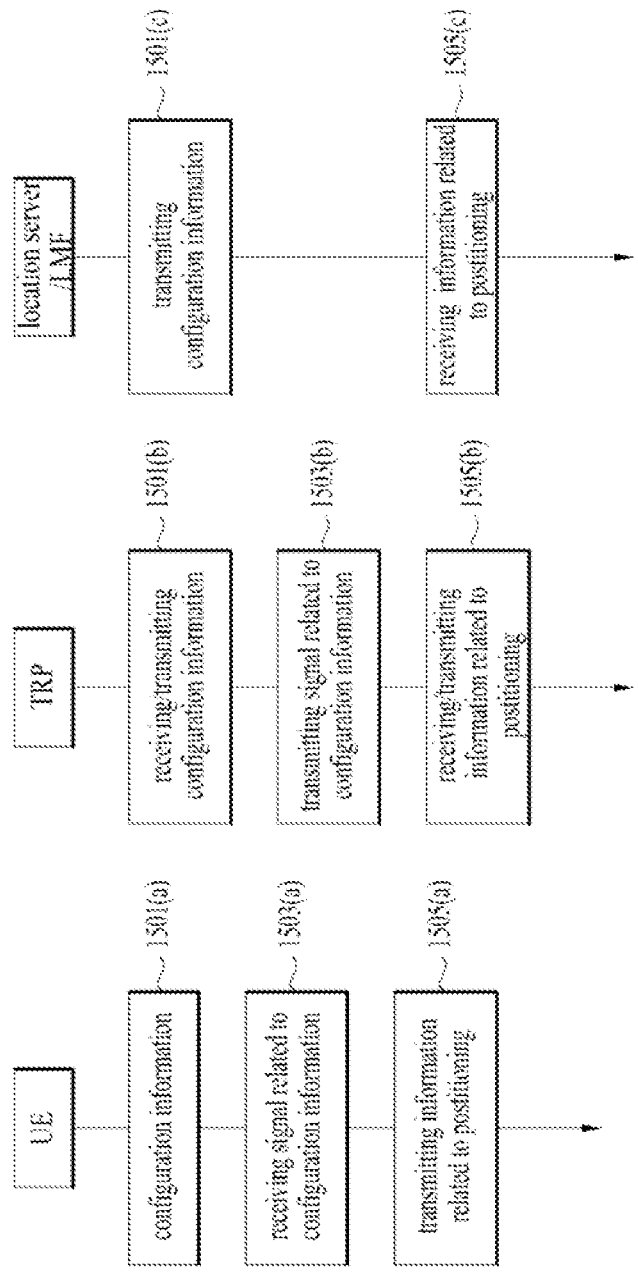
FIG. 15 is a simplified diagram illustrating a method of operating a UE, a TRP, a location server, and/or an LMF according to various embodiments.

FIG. 15 is a simplified diagram illustrating an operating method of a UE, a TRP, a location server, and/or an LMF according to various embodiments.

Referring to FIG. 15(a), in operation 1501(a) according to various embodiments, the UE may receive configuration information.

In operation 1503(a) according to various embodiments, the UE may receive a signal related to the configuration information.

In operation 1505(a) according to various embodiments, the UE may transmit information related to positioning.

Referring to FIG. 15(b), in operation 1501(b) according to various embodiments, the TRP may receive configuration information from the location server and/or the LMF and transmit the configuration information to the UE.

In operation 1503(b) according to various embodiments, the TRP may transmit a signal related to the configuration information.

In operation 1505(b) according to various embodiments, the TRP may receive information related to positioning and transmit the information related to positioning to the location server and/or the LMF.

Referring to FIG. 15(c), in operation 1501(c) according to various embodiments, the location server and/or the LMF may transmit configuration information.

In operation 1505(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Figure 16:
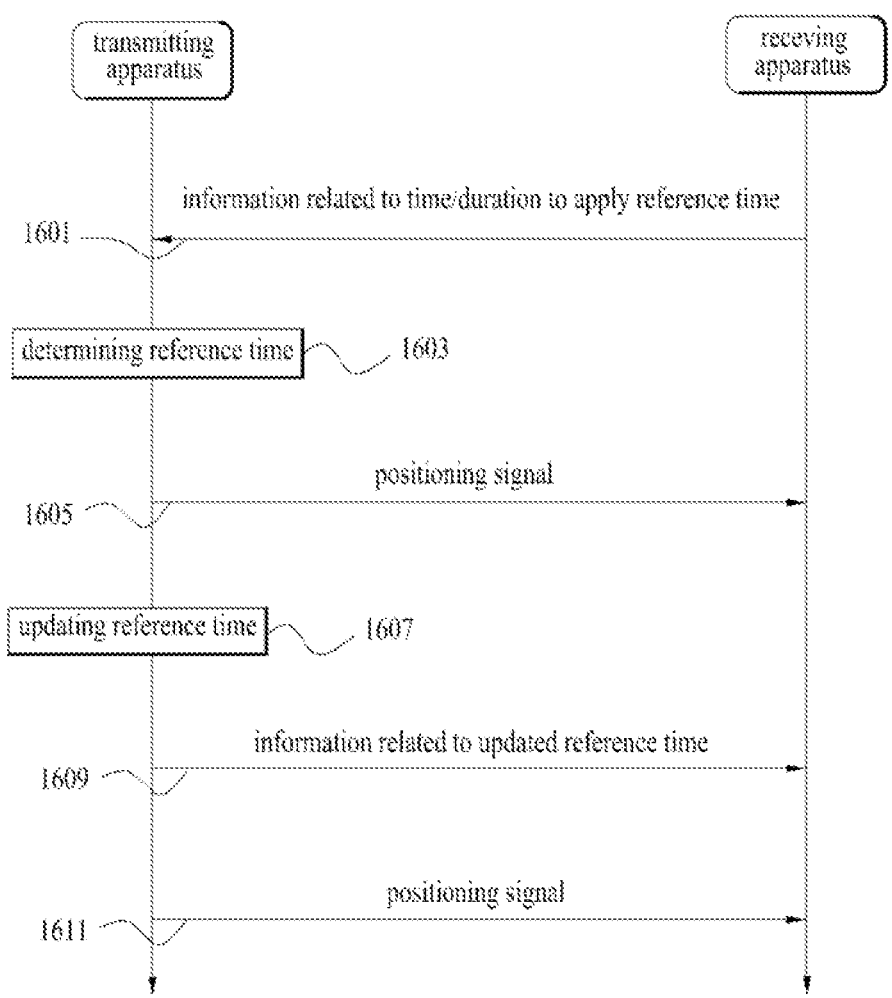
FIG. 16 is a flowchart illustrating an example of an operation method of a transmission end and a reception end according to various embodiments.

FIG. 16 is a flowchart illustrating an example of an operation method of a transmission end and a reception end according to various embodiments.

Figure 17:
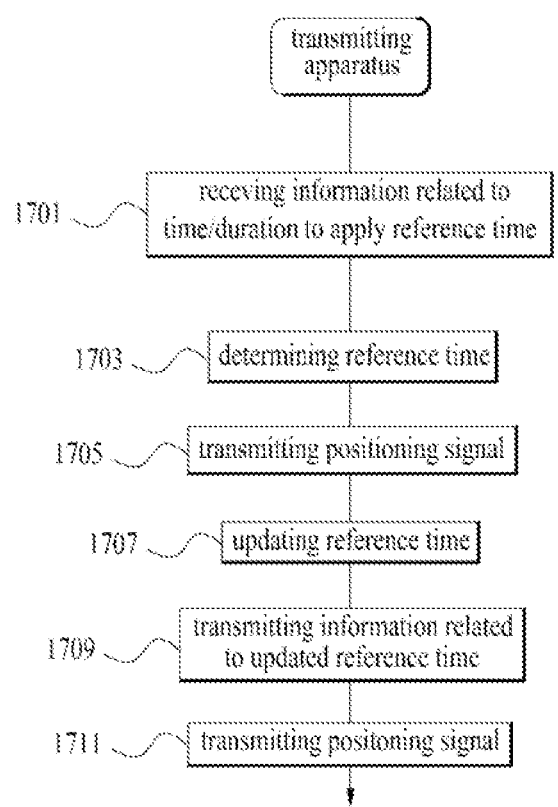
FIG. 17 is a simplified diagram illustrating an operation method of a transmission end according to various embodiments.

FIG. 17 is a simplified diagram illustrating an operation method of a transmission end according to various embodiments.

Figure 18:
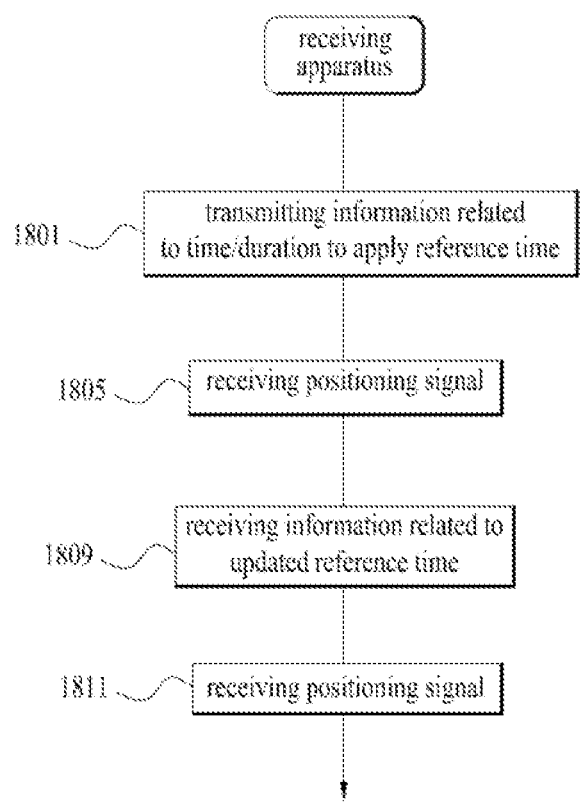
FIG. 18 is a simplified diagram illustrating an operation method of a reception end according to various embodiments.

FIG. 18 is a simplified diagram illustrating an operation method of a reception end according to various embodiments.

Referring to FIGS. 16 to 18, in operations 1601, 1701, and 1801 according to various embodiments, the reception end may transmit information related to a time and/or a duration to which a reference time is applied and the transmission end may receive the information.

In operations 1603 and 1703 according to various embodiments, the transmission end may determine the reference time for transmitting a positioning signal.

In operations 1605, 1705, and 1805 according to various embodiments, the transmission end may transmit the positioning signal and the reception end may receive the positioning signal. For example, the positioning signal may be based on one or more of the reference time and/or a (time-domain) cyclic shift.

In operations 1607 and 1807 according to various embodiments, the transmission end may update the reference time.

In operations 1609, 1709, and 1809 according to various embodiments, the transmission end may transmit information related to the updated reference time and the reception end may receive the information.

In operations 1611, 1711, and 1811 according to various embodiments, the transmission end may transmit the positioning signal and the reception end may receive the positioning signal. For example, the positioning signal may be based on one or more of the updated reference time and/or the (time-domain) cyclic shift.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

For example, in Method 1 described below, the transmission end may be the UE and the reception end may be the BS/location server. For example, in Method 2 described below, the transmission end may be the BS/location server and the reception end may be the UE. For example, when the transmission end is the BS/location server, operations 1601 and 1701 according to various embodiments may be omitted.

Hereinafter, various embodiments will be described in detail. Various embodiments described below may be totally or partially combined to form various other embodiments, and this will be obviously appreciated by those skilled in the art.

3.1. Method 1

According to various embodiments, in UL transmission, the UE may transmit a UL signal according to a reference time (and/or a reference UL time grid) for transmitting the UL signal. In a description of various embodiments, the reference time may be replaced with the reference (UL) time grid, and the reference (UL) time grid may be replaced with the reference time, unless mentioned otherwise.

According to various embodiments, the UE may maintain the reference time for transmitting the UL signal for a specific time.

Embodiment 1

According to various embodiments, the reference time may be a UL time grid at a timing when the UE transmits the UL signal for positioning at any timing.

According to various embodiments, the location server may recognize a time of a UL positioning signal received by any BS at any timing as a reference transmission time for the UE. For example, the UE may be a UE that has transmitted the UL positioning signal. According to various embodiments, the location server may then identify/recognize that the UL positioning signal transmitted by the UE has been transmitted in synchronization with the reference time.

According to various embodiments, the UE may transmit the UL positioning signal in synchronization with the reference time (and/or reference UL time grid).

Embodiment 2

According to various embodiments, if there is difference between the reference time and a time when the UE desires to transmit the UL signal at a specific timing, the UE may transmit a signal for positioning in synchronization with the reference time.

According to various embodiments, when the reference UL time grid and a UL time grid at a specific timing do not coincide, any signal(s)/channel(s) may be transmitted in synchronization with the UL time grid of the timing (specific timing) but the UL positioning signal may be transmitted in synchronization with the reference UL time grid. For example, one or more of the following methods may be applied:

1) For example, a transmission timing of the positioning signal may be physically changed. For example, the transmission timing of the positioning signal may be changed/shifted in the time domain.
2) For example, the UE may transmit the UL positioning signal in synchronization with the UL time grid of the specific timing but transmit the UL positioning signal by applying a (time-domain) cyclic shift with respect to a time difference between the reference UL time grid and the UL time grid of the specific timing. For example, since the transmission timing of the positioning signal is maintained and the cyclic shift is applied to the positioning signal, the reception side may recognize that the transmission timing of the UL positioning signal is equal/similar to a time changed/shifted in the time domain. For example, the cyclic shift may correspond to applying a phase value linearly increased/decreased for each RE in a frequency region (frequency domain) to the RE (e.g., a phase increment value is applied). For example, the phase increment value may be determined according to a time difference with the reference time. For example, the phase increment value may be determined according to a time difference between the reference time and the transmission timing of the positioning signal. For example, when a UL transmission timing is determined as a specific timing and a plurality of OFDM symbols is transmitted based on the same transmission timing, the same phase vector may be applied to each OFDM symbol.

For example, if a time difference between the reference time grid and the time grid of the specific timing exceeds the range of a cyclic shift that may be applied by the UE, the UE may apply a cyclic shift available in a specific range to a UL PRS and additionally transmit information indicating that the time difference exceeds the specific range to the location server. For example, for this purpose, an RS allocated for positioning may be used. For example, a method of selecting a specific resource from a resource set and/or a method of using another sequence (sequence related to the RS) may be used. For example, the applicable range of the cyclic shift may correspond to or be based on an $N_{fft}$ size (fast Fourier transform size), a cyclic shift applied to an SRS, and/or a value determined according to a comb value.

Embodiment 3

According to various embodiments, a time duration in which the reference UL time grid is maintained may be a value indicated to the UE by the location server.

According to various embodiments, the reference UL time grid may be maintained for a predetermined time duration. According to various embodiments, the location server may transmit information about the time duration in which the reference UL time grid is maintained to the UE. According to various embodiments, the UE may recognize/identify the time duration in which the reference UL time grid is maintained based on the information about the time duration, received from the location server.

Embodiment 4

According to various embodiments, the reference UL time grid may be updated/reconfigured. For example, one of the following methods may be applied:
1) For example, the reference time may be changed after a maintenance time of the reference time is ended.
2) For example, if a difference value between the reference time and an actual transmission time exceeds a specific value, the UE may change the reference UL time grid. For example, if the difference value between the reference time and the actual transmission time exceeds the specific value, it may be difficult to compensate for the difference between the reference time and the actual transmission time although the transmission timing of the positioning signal is physically changed and/or a cyclic shift is applied. For example, in this case, the UE may change the reference UL time grid. For example, the specific value may be related to a maximum value to which a physical change of the transmission timing of the positioning signal is applicable and/or a maximum value to which the cyclic shift is applicable. For example, if the above condition is satisfied even within the maintenance time of the reference time, the UE may change the reference UL time grid.

For example, when the UE changes the reference UL time grid, the UE may indicate whether the change is made and/or how much change is made to the reception end. For example, for this purpose, an RS allocated for positioning may be used. For example, there may be a method of selecting a specific resource from a resource set and/or a method of using another sequence (sequence related to the RS).

For example, the receiving end may inform the location server of whether the reference time of the UE has changed and/or how much the reference time has been changed. For example, when estimating the location of the UE, the location server may consider whether the reference time has been changed and/or how much the reference time has been changed. For example, information reported to the location server may be information indicating that the reference time (and/or reference UL time grid) has been changed and/or information about the degree of change of the reference time (and/or reference UL time grid).

3) As a specific example, when the reference time is changed, the transmission end may transmit the information indicating that the reference time has been changed by being carried on a UL PRS. For example, as a method of reflecting the information about the change of the reference time in the PRS, there may be a method of changing sequence initialization or a method of changing scrambling. For example, one or more of a parameter for sequence initialization related to generation of a UL PRS sequence and/or a parameter for scrambling may be changed. For example, a change value of the reference time may be expressed as a relative value of an existing reference time (before change) and/or a relative value of the reference time. On the other hand, when the information about the change of the reference time has already been shared through the location server, only the change of the reference time may be indicated. For example, if the change value of the reference time has already been transmitted to the location server, only the fact that the reference time has been changed may be indicated.

4) As another specific example, the transmission end may indicate the information about the change of the reference time using a higher-layer message (e.g., a higher-layer parameter). For example, the change value of the reference time may be expressed as the relative value of the existing reference time (before change) and/or the relative value of the reference time. On the other hand, when the information about the reference time change has already been shared through the location server, only the change of the reference time may be indicated. For example, if the change value of the reference time has already been transmitted to the location server, only the fact that the reference time has been changed may be indicated.

5) Here, when the reference time has been changed, the UE may transmit the UL PRS at a timing corresponding to the existing reference time (before change) without applying a new reference time so as to prevent positioning accuracy from being degraded.

Figure 19:
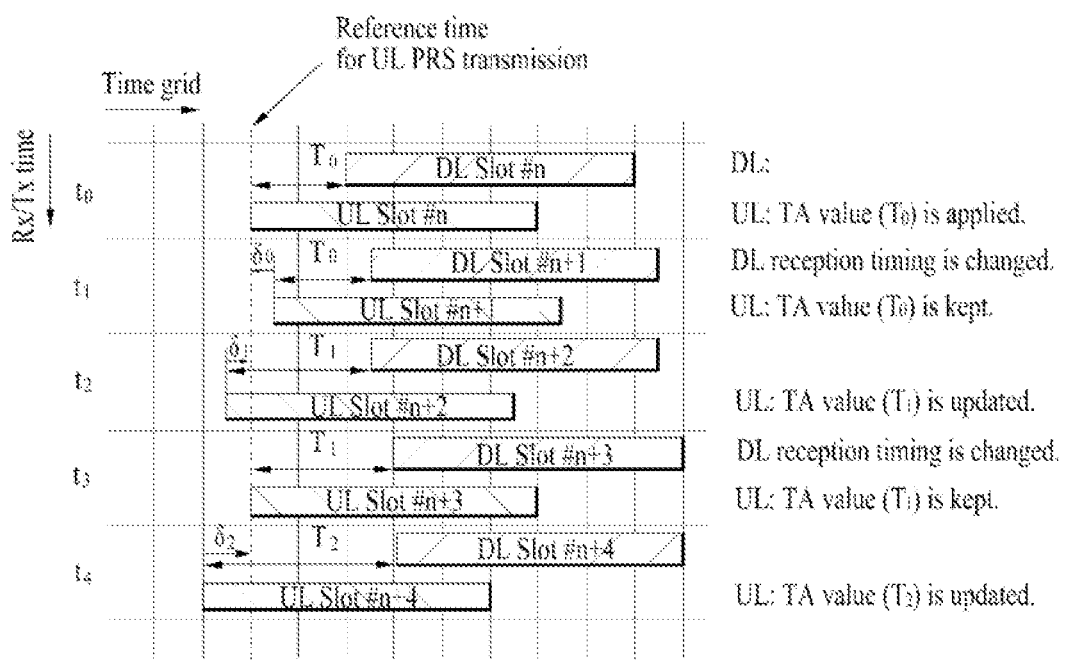
FIG. 19 is a diagram illustrating an example of UL timings at which the UE transmits signals according to various embodiments.

FIG. 19 is a diagram illustrating an example of UL timings at which the UE transmits signals according to various embodiments. FIG. 19 may illustrate an example of change in DL reception timings and UL transmission timings of the UE according to various embodiments.

Referring to FIG. 19, a reference time may represent the first SRS transmission time. Next, when the UE transmits the same SRS resource and/or different SRS resources, the SRS resource needs to be transmitted at the reference time so that timing measurement may be sufficiently accurate with respect to both a serving cell and neighboring cells.

However, for example, the SRS may not be transmitted at the reference time. For example, when a reception timing of a DL signal is changed but a TA value is maintained and/or an updated TA value is applied, a network may be unaware of a changed time of the reception timing of the DL signal and/or a time to which the UE applies the updated TA value, so that a measurement error may occur.

For example, $\delta_0$ may represent a transmission timing difference caused by change in the reception timing of the DL signal when a TA is fixed. For example, $\delta_1$ and $\delta_2$ may represent transmission timing differences caused by updating of the TA.

For example, a main problem may be that the network is not aware of $\delta_0$, $\delta_1$, and $\delta_2$ and thus an error may occur in timing measurement obtained from a UL SRS resource. For example, a few methods may be considered to solve this problem.

1) For example, additional signaling to inform the BS/TRP/location server of change of the DL reception timing and/or a TA updating time may be considered so that the network may correct the measurement error.
2) For example, the reference time may be introduced. For example, the UE may transmit an SRS resource at a fixed timing even when a UL transmission timing is changed.
3) For example, the reference time may be introduced. For example, a method in which an SRS received by the BS/TRP appears to be transmitted by the UE at the reference time by multiplying an SRS sequence by a linearly increased phase rotation vector element-by-element may be considered. In this case, the network needs not be aware of change in the UL transmission timing and the reference time may be naturally obtained from first SRS transmission, so that additional signaling may not be needed. For example, the UE may inform the network of related information only when the reference time is changed. For example, the reference time may be changed when the DL reception time and/or the updated TA value is too high to be corrected through phase rotation.

Referring to FIG. 19, for example, at time $t_0$, the UE may transmit a UL signal by applying a TA value $T_0$ based on a DL time grid. For example, in this case, a UL time grid used for UL transmission may be a reference UL time grid and/or a reference time used to transmit a PRS.

Next, for example, at time $t_1$, the DL time grid may be slightly changed (e.g., as much as $\delta_0$) according to reception of a DL signal. For example, if the previously used TA value $T_0$ is applied based on the changed DL time grid, there may be a time difference corresponding to $\delta_0$ with the reference time grid.

For example, the UE may transmit a UL PRS by compensating for a time corresponding to $\delta_0$. For example, a method in which the UE according to the above-described various embodiments performs transmission by physically adjusting a TA and/or a method of applying a time-domain cyclic shift to the UL PRS by a value corresponding to $\delta_0$ while maintaining a current UL grid may be applied.

Next, for example, at time $t_2$, the UL signal may be transmitted according to an updated TA value $T_1$. In this case, for example, if $T_1$ is applied to the DL time grid, there may be a time difference corresponding to $\delta_1$ with the reference time grid. For example, the UE may transmit the UL PRS by compensating for a time corresponding to $\delta_1$. For example, a method in which the UE according to the above-described various embodiments performs transmission by physically adjusting the TA and/or a method of applying a time-domain cyclic shift to the UL PRS by a value corresponding to $\delta_1$ while maintaining the current UL grid may be applied.

Next, for example, at time $t_3$, the UL signal may be transmitted according to the updated TA value $T_1$. In this case, for example, if a result of applying $T_1$ to the DL time grid is identical to the reference time grid, the UE may transmit the UL PRS without additional compensation.

Next, for example, at time $t_4$, the UL signal may be transmitted according to an updated TA value $T_2$. In this case, for example, if $T_2$ is applied to the DL time grid, there may be a time difference corresponding to $\delta_2$ with the reference time grid. For example, the UE may transmit the UL PRS by compensating for a time corresponding to $\delta_2$. For example, a method in which the UE according to the above-described various embodiments performs transmission by physically adjusting the TA and/or a method of applying a time-domain cyclic shift to the UL PRS by a value corresponding to $\delta_2$ while maintaining the current UL grid may be applied.

According to various embodiments, even when the DL reception timing is changed and/or the TA value is updated, the reference time, which is a fixed time, may be introduced during at least a predetermined time duration.

According to various embodiments, the UE may report information about change of the reference time.

According to various embodiments, the UE compensates for change of an SRS transmission time through a phase rotation method in the frequency domain so that the SRS received by the BS/TRP signal may appear to be transmitted at the reference time.

According to various embodiments, the UE may be indicated/configured to transmit the SRS resource at the reference time even when the SRS transmission time is changed due to change of the DL reception timing and/or updating of the TA value.

3.2. Method 2

According to various embodiments, each transmission end may share the reference time in order to transmit a DL signal.

According to various embodiments, the transmission end may reflect difference between the reference time and an actual transmission time during DL transmission.

Embodiment 1

According to various embodiments, the reference time may be a specific time shared by the network.

For example, the reference time may be a GPS time and/or a transmission time of a specific BS.

For example, in the case of sidelink (SL), the reference time may be the GPS time, a time at which a signal is received from a specific BS, and/or a reception time of a signal of a specific UE.

Embodiment 2

According to various embodiments, a time-domain cyclic shift may be applied to a (DL/SL) signal, so that a difference between the reference time and an actual transmission time may be compensated.

For example, in the case of DL, the BS may apply a phase value which is linearly increased/decreased with respect to a PRS in the frequency domain to each RE.

For example, in the case of SL, the UE may apply a phase value which is linearly increased/decreased with respect to the PRS in the frequency domain to each RE.

Figure 20:
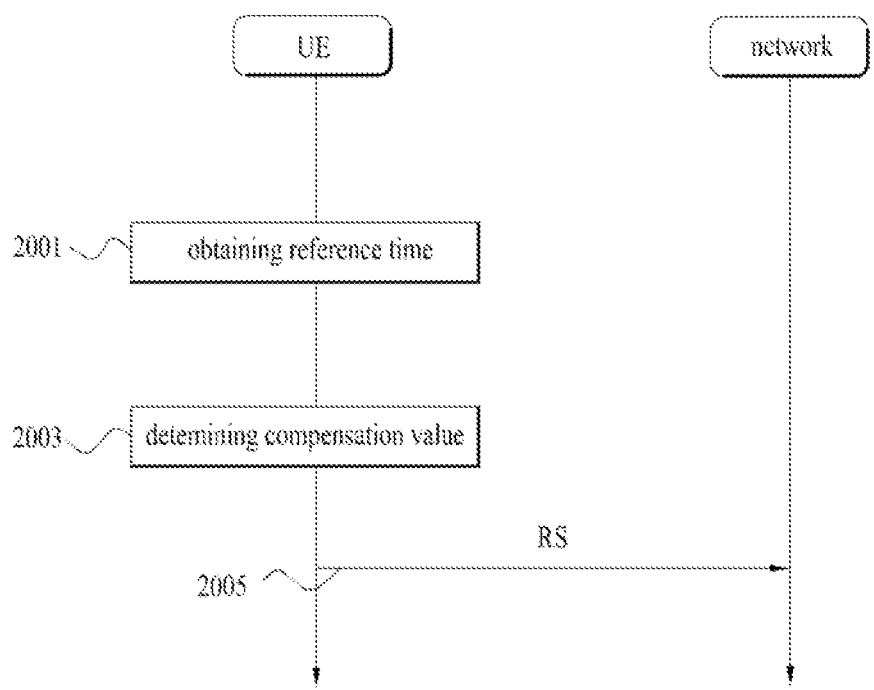
FIG. 20 is a simplified diagram illustrating an operation method of a UE and a network according to various embodiments.

FIG. 20 is a simplified diagram illustrating an operation method of a UE and a network according to various embodiments.

Figure 21:
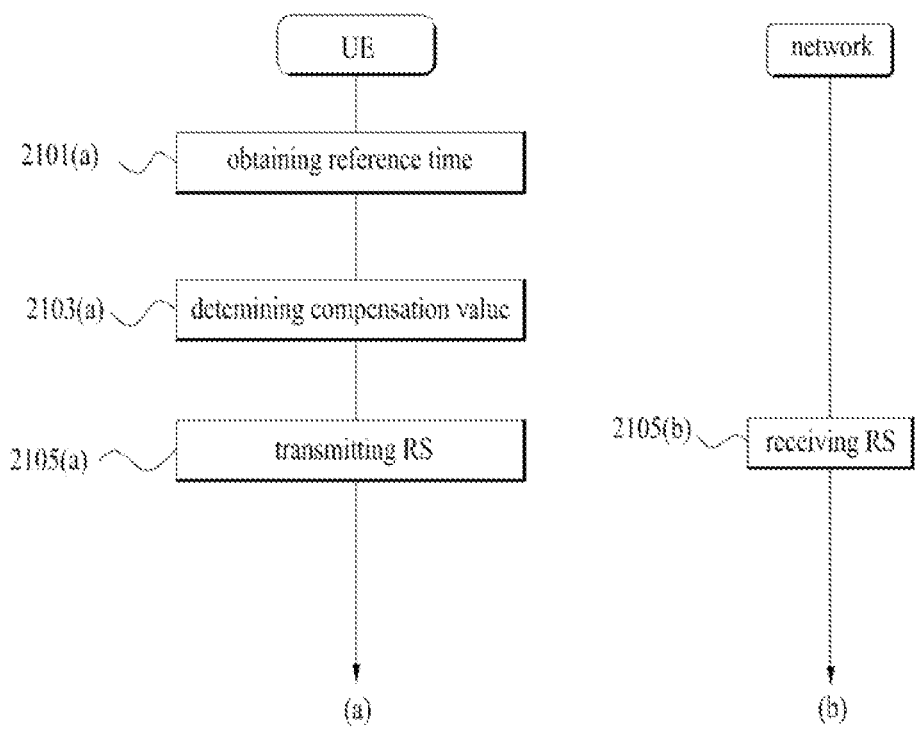
FIG. 21 is a flowchart illustrating an operation method of a UE and a network according to various embodiments.

FIG. 21 is a flowchart illustrating an operation method of a UE and a network according to various embodiments.

Referring to FIGS. 20 and 21, in operations 2001 and 2101(a) according to various embodiments, the UE may determine a reference time. For example, the reference time may be related to transmission of an RS for positioning.

In operations 2003 and 2103(a) according to various embodiments, the UE may determine a compensation value. For example, the compensation value may be determined based on a difference between a UL transmission timing and the reference time. For example, the UL transmission timing may be obtained from a TA and a DL reception timing.

In operations 2005, 2105(a). and 2105(b) according various embodiments, the UE may transmit the RS and the network may receive the RS. For example, the RS may be based on the compensation value.

More specific operations of the UE and/or the TP and/or the location server according to the above-described various embodiments may be described and performed based on the descriptions of clause 1 to clause 3.

Examples of the above-described proposed methods may also be included as one of various embodiments, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments

4.1. Exemplary Configurations of Devices to which Various Embodiments are Applied FIG. 22 is a diagram illustrating a device that implements various embodiments.

Figure 22:
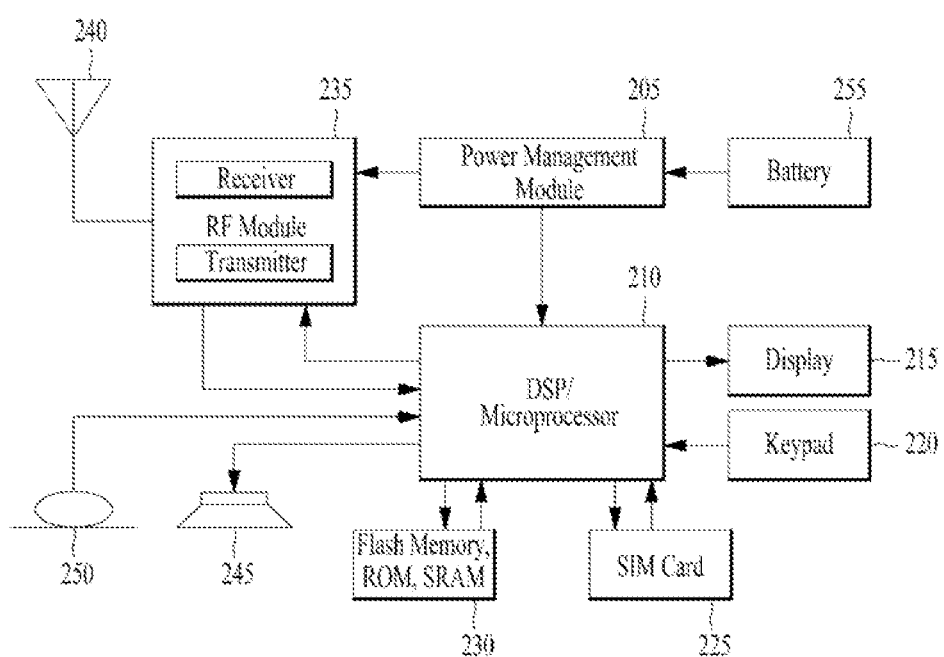
FIG. 22 is a block diagram illustrating an apparatus for implementing various embodiments.

The device illustrated in FIG. 22 may be a UE and/or a BS (e.g., eNB or gNB or TP) and/or a location server (or LMF) which is adapted to perform the above-described mechanism, or any device performing the same operation.

Referring to FIG. 22, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 22 may illustrate a ULE including a receiver 235 configured to receive a request message from a network and a transmitter 235 configured to transmit timing transmission/reception timing information to the network. These receiver and transmitter may form the transceiver 235. The ULE may further include a processor 210 coupled to the transceiver 235.

Further, FIG. 22 may illustrate a network device including a transmitter 235 configured to transmit a request message to a UE and a receiver 235 configured to receive timing transmission/reception timing information from the UE. These transmitter and receiver may form the transceiver 235.

The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the one or more processors included in the UE (or one or more processors of the communication device included in the UE) may obtain a reference time related to transmission of an RS for positioning.

According to various embodiments, the one or more processors included in the UE may determine a compensation value based on a difference between a UL transmission timing obtained from a TA and a DL reception timing, and the reference time.

According to various embodiments, the one or more processors included in the UE may transmit the RS based on the compensation value.

According to various embodiments, the one or more processors included in the network node (or the one or more processors of the communication device included in the network node) may receive the RS for position based on the compensation value.

According to various embodiments, one or more processors included in the network node may decode the RS.

According to various embodiments, the compensation value may be determined based on a difference between the UL transmission timing obtained from the TA and the DL reception timing, and the reference time.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied In the present specification, various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 23:
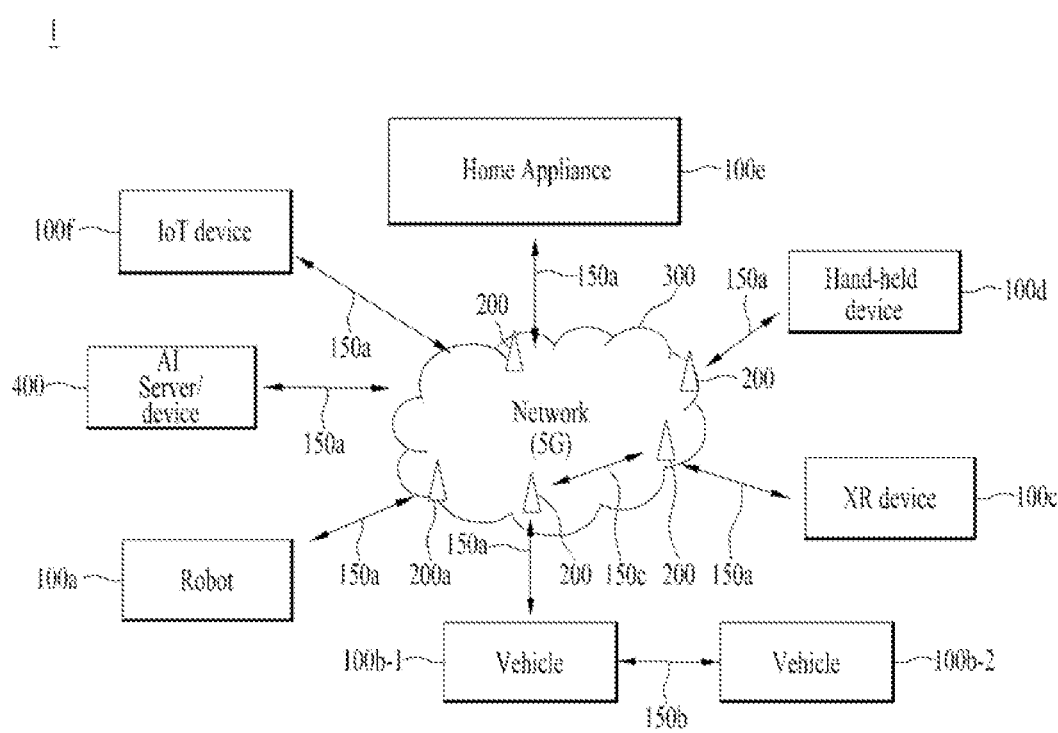
FIG. 23 illustrates an exemplary communication system to which various embodiments are applied.

FIG. 23 illustrates an exemplary communication system to which various embodiments are applied.

Referring to FIG. 23, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

4.2.1 Example of Wireless Devices to which Various Embodiments are Applied

Figure 24:
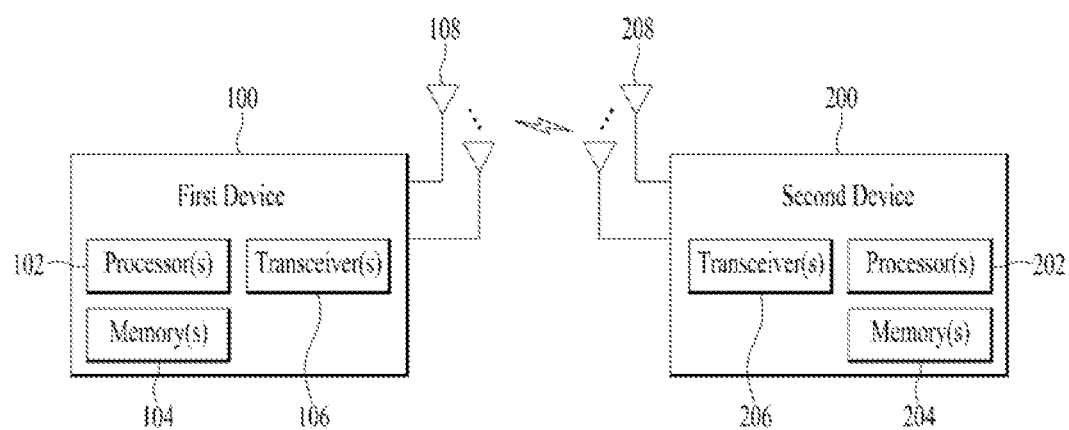
FIG. 24 illustrates exemplary wireless devices to which various embodiments are applicable.

FIG. 24 illustrates exemplary wireless devices to which various embodiments are applicable.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments, one or more memories (e.g., 104 or 204) may store instructions or programs which, when executed, cause one or more processors operably coupled to the one or more memories to perform operations according to various embodiments or implementations of the present disclosure.

According to various embodiments, a computer-readable storage medium may store one or more instructions or computer programs which, when executed by one or more processors, cause the one or more processors to perform operations according to various embodiments or implementations of the present disclosure.

According to various embodiments, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 25:
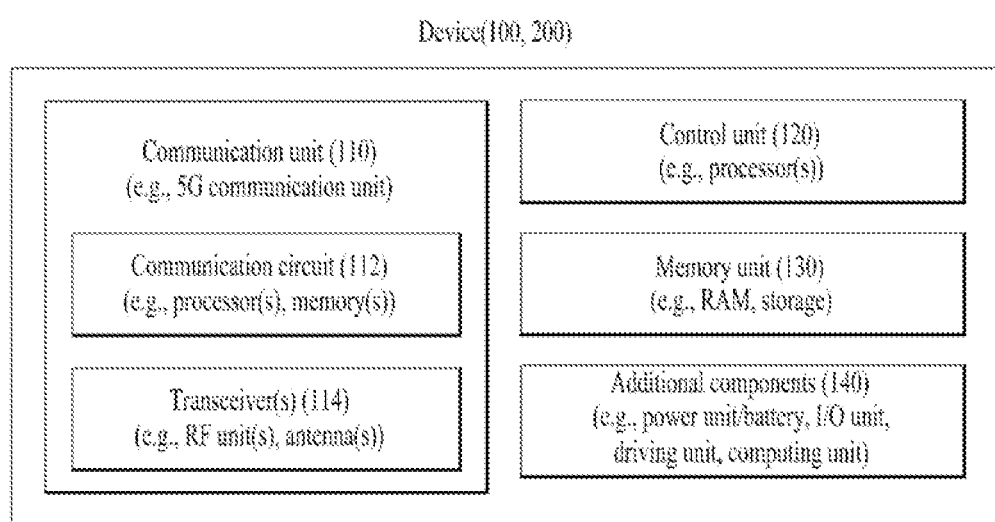
FIG. 25 illustrates other exemplary wireless devices to which various embodiments are applied.

4.2.2. Example of Using Wireless Devices to which Various Embodiments are Applied FIG. 25 illustrates other exemplary wireless devices to which various embodiments are applied. The wireless devices may be implemented in various forms according to a use case/service (see FIG. 23).

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

4.2.3. Example of Portable Device to which Various Embodiments are Applied

Figure 26:
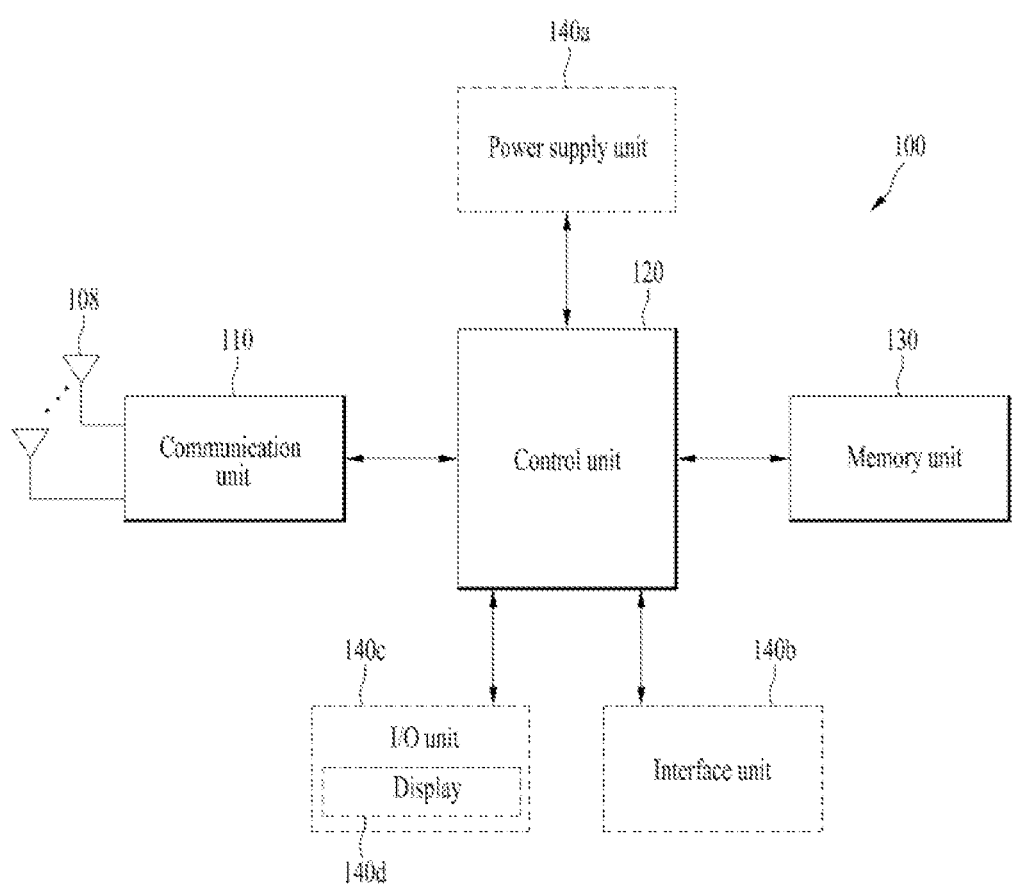
FIG. 26 illustrates an exemplary portable device to which various embodiments are applied.

FIG. 26 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 25, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
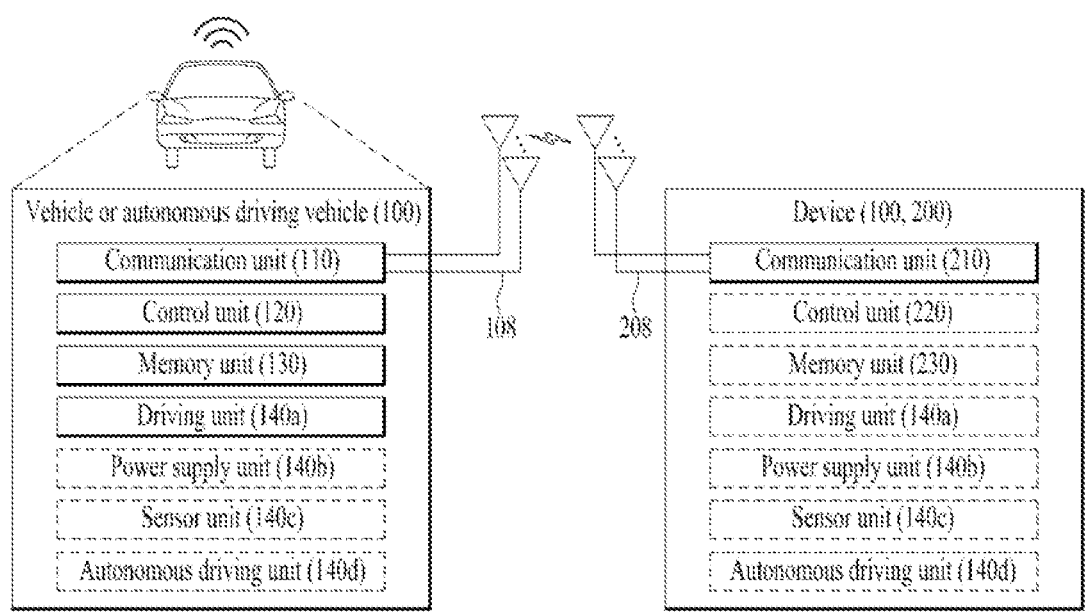
FIG. 27 illustrates an exemplary vehicle or autonomous driving vehicle to which various embodiments are applied.

4.2.4. Example of Vehicle or Autonomous Driving Vehicle to which Various Embodiments FIG. 27 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

A wireless communication technology for implementing various embodiments may include Narrowband Internet of Things for low power communication as well as LTE, NR, and 6G. In this case, for example, the NB-IoT technology may be an example of a Low Power Wide Area Network (LPWAN) technology and may be implemented in standards such as LTE Cat NB1 and/or LTE Cat NB2, and is not limited to the above-described name. Additionally or alternatively, the wireless communication technology implemented in a wireless device according to various embodiments may perform communication based on the LTE-M technology. In this case, for example, the LTE-M technology may be an example of the LPWAN technology and may be called various terms such as enhanced Machine Type Communication (eMTC). For example, the LTE-M technology may be implemented as at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and may not be limited to the aforementioned terms. Additionally or alternatively, the wireless communication technology implemented in the wireless device according to various embodiments may include at least one of ZigBee, Bluetooth, or Low Power Wide Area Network (LPWAN) in consideration of low power communication and is not limited to the aforementioned terms. For example, the ZigBee technology may generate personal area networks (PAN) related to small/low-power digital communication based on various standards such as IEEE 802.15.4 and may be called various terms.

Various embodiments may be implemented in various means. For example, various embodiments may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

What is claimed is:

1. A method performed by a user equipment (UE) in a wireless communication system, the method comprising:
   obtaining a first reference time related to transmission of a first reference signal (RS) for positioning;
   determining a compensation value based on a difference between an uplink transmission timing, obtained from a timing advance (TA) and a downlink reception timing, and the first reference time; and
   transmitting the first RS based on the compensation value,
   wherein the first reference time is updated to a third reference time based on the difference between the uplink transmission timing and the first reference time being equal to or greater than a preset value,
   wherein the compensation value is determined based on the third reference time, and
   wherein a difference between the uplink transmission timing and the third reference time is less than the preset value.

2. The method of claim 1, wherein the first RS is transmitted from the first reference time based on application of the compensation value to the uplink transmission timing or from the uplink transmission timing based on application of a cyclic shift value related to the compensation value to each resource element (RE) to which the first RS is mapped.

3. The method of claim 1,
   wherein the first reference time is maintained during a preset time duration, and the reference time is updated to a second reference time after the preset time duration, and
   wherein the method further comprises transmitting information related to the second reference time.

4. The method of claim 3, further comprising
   receiving information related to configuration of the preset time duration.

5. The method of claim 1, further comprising:
   transmitting information related to the difference between the uplink transmission timing and the first reference time being equal to or greater than the preset value; and
   transmitting information related to the third reference time.

6. The method of claim 1, wherein the first reference time is obtained from a transmission timing of a second RS for positioning, transmitted before the first RS is transmitted.

7. An apparatus configured to operate in a wireless communication system, the apparatus comprising:
   a memory; and
   at least one processor coupled with the memory,
   wherein the at least one processor is configured to:
   obtain a first reference time related to transmission of a first reference signal (RS) for positioning,
   determine a compensation value based on a difference between an uplink transmission timing, obtained from a timing advance (TA) and a downlink reception timing, and the first reference time, and
   transmit the first RS based on the compensation value,
   wherein the first reference time is updated to a third reference time based on the difference between the uplink transmission timing and the first reference time being equal to or greater than a preset value,
   wherein the compensation value is determined based on the third reference time, and wherein a difference between the uplink transmission timing and the third reference time is less than the preset value.

8. The apparatus of claim 7, wherein the first RS is transmitted from the first reference time based on application of the compensation value to the uplink transmission timing or from the uplink transmission timing based on application of a cyclic shift value related to the compensation value to each resource element (RE) to which the first RS is mapped.

9. The apparatus of claim 7,
wherein the first reference time is maintained during a preset time duration, and the reference time is updated to a second reference time after the preset time duration, and
wherein one or more processors transmit information related to the second reference time.

10. The apparatus of claim 7, wherein the apparatus communicates with one or more of a mobile terminal, a network, and an autonomous driving vehicle other than a vehicle in which the apparatus is included.

11. A method performed by an apparatus in a wireless communication system, the method comprising:
receiving a first reference signal (RS) for positioning based on a compensation value; and
decoding the first RS,
wherein the compensation value is determined based on a difference between an uplink transmission timing, obtained from a timing advance (TA) and a downlink reception timing, and a first reference time related to transmission of the first RS,
wherein the first reference time is updated to a third reference time based on the difference between the uplink transmission timing and the first reference time being equal to or greater than a preset value,
wherein the compensation value is determined based on the third reference time, and
wherein a difference between the uplink transmission timing and the third reference time is less than the preset value.

12. An apparatus for operating in a wireless communication system, the apparatus comprising:
a memory; and
at least one processor coupled with the memory,
wherein the at least one processor is configured to:
receive a first reference signal (RS) for positioning based on a compensation value, and
decode the first RS, and
wherein the compensation value is determined based on a difference between an uplink transmission timing, obtained from a timing advance (TA) and a downlink reception timing, and a first reference time related to transmission of the first RS,
wherein the first reference time is updated to a third reference time based on the difference between the uplink transmission timing and the first reference time being equal to or greater than a preset value,
wherein the compensation value is determined based on the third reference time, and
wherein a difference between the uplink transmission timing and the third reference time is less than the preset value.

* * * * *